United States Patent
Ikeya

(10) Patent No.: US 7,207,320 B2
(45) Date of Patent: Apr. 24, 2007

(54) FUEL PUMP UNIT

(75) Inventor: Masaki Ikeya, Obu (JP)

(73) Assignee: Aisan Kogyo Kabushiki Kaisha, Aichi-ken (JP)

(*) Notice: Subject to any disclaimer, the term of this patent is extended or adjusted under 35 U.S.C. 154(b) by 0 days.

(21) Appl. No.: 11/217,432

(22) Filed: Sep. 2, 2005

(65) Prior Publication Data

US 2006/0048756 A1   Mar. 9, 2006

(30) Foreign Application Priority Data

Sep. 3, 2004 (JP) .............................. 2004-257264

(51) Int. Cl.
*F02M 37/04* (2006.01)
*F02M 37/08* (2006.01)

(52) U.S. Cl. .................................... 123/509; 210/416.4

(58) Field of Classification Search ................ 123/509, 123/495, 497, 510; 210/191, 258, 603, 416.1, 210/416.4

See application file for complete search history.

(56) References Cited

U.S. PATENT DOCUMENTS

| | | | |
|---|---|---|---|
| 5,036,822 A | | 8/1991 | Kojima |
| 5,511,957 A | * | 4/1996 | Tuckey et al. ............... 417/313 |
| 5,820,754 A | | 10/1998 | Cassidy et al. |
| 5,908,020 A | * | 6/1999 | Boutwell et al. ............ 123/541 |
| 6,029,633 A | * | 2/2000 | Brandt ......................... 123/509 |
| 6,156,201 A | * | 12/2000 | Ueda et al. ............... 210/416.4 |
| 6,196,200 B1 | * | 3/2001 | Roche ......................... 123/509 |
| 6,293,258 B1 | | 9/2001 | Frank |
| 6,457,458 B1 | * | 10/2002 | Frank et al. ................. 123/509 |
| 2003/0000882 A1 | * | 1/2003 | Harvey et al. .............. 210/235 |
| 2004/0020839 A1 | * | 2/2004 | Kato et al. .................. 210/232 |
| 2004/0129696 A1 | * | 7/2004 | Fischer et al. ........... 210/416.4 |

FOREIGN PATENT DOCUMENTS

| | | |
|---|---|---|
| JP | 08200175 | 8/1996 |
| JP | 10-30513 | 2/1998 |

* cited by examiner

*Primary Examiner*—Mahmoud Gimie
(74) *Attorney, Agent, or Firm*—Dennison, Schultz & MacDonald

(57) ABSTRACT

A fuel pump unit (1) may comprise a fuel filter (10) and a fuel pump (30). The fuel filter (10) may comprise frames (14, 20) and filters (15, 22) that seal openings (16, 21) of the frames. A closed space (internal space) may be formed by the frames and the filters. The fuel pump (30) may comprise a suction port (32) and a discharge port (33). The fuel pump (30) draws in fuel through the suction port (32), pressurizes it, and discharges it from the discharge port (33). Preferably, the fuel pump (30) is substantially accommodated within the internal space of the fuel filter (10). The suction port (32) of the fuel pump (30) opens in the internal space of the fuel filter (10), and the discharge port opens outside the fuel filter (10).

10 Claims, 30 Drawing Sheets

FUEL PUMP UNIT

CROSS REFERENCE

This application claims priority to Japanese patent application number 2004-257264, filed Sep. 3, 2004, the contents of which are hereby incorporated by reference as if fully set forth herein.

BACKGROUND OF THE INVENTION

1. Field of the Invention

The present invention relates to a fuel pump unit comprising a fuel pump and a fuel filter.

2. Description of the Related Art

Japanese Laid-open Patent Publication No. 10-30513 describes a fuel pump unit for supplying fuel from a fuel tank to an internal combustion engine. This fuel pump unit comprises a fuel pump and a fuel filter. A suction port is provided at the bottom of the fuel pump, and a discharge port is provided at the top of the fuel pump. The fuel filter partly covers the lower half of the fuel pump. When the fuel pump is in operation, fuel from the fuel tank passes through the fuel filter and is sucked into the fuel pump through the suction port. The fuel pump pressurizes the sucked-in fuel and discharges it from the discharge port. Impurities contained in the fuel are removed when the fuel passes through the fuel filter.

SUMMARY OF THE INVENTION

In this type of fuel pump unit, impurities adhere to the fuel filter over time, and the fluid resistance of the fuel filter gradually increases. This increase in the fluid resistance of the fuel filter (pressure loss) leads to a decline in fuel pump efficiency. Thus, it would be preferable to increase the filtration area of the fuel filter, and check this increasing pressure loss. In conventional fuel pump units as used in the past, however, the filtration area of the fuel filter has not been large enough, and it has not been possible to check the pressure loss of the fuel filter adequately.

Accordingly, it is one object of the present teachings to provide a fuel pump unit that makes it possible to increase the filtration area of the fuel filter.

In one aspect of the present teachings, a fuel pump unit may comprise a fuel pump and a fuel filter. The fuel pump may have a suction port and a discharge port. The fuel filter may comprise a frame and a filter that seals an opening in this frame. The fuel filter may have a closed space (internal space) formed by the frame and the filter. The fuel pump may be substantially accommodated within the internal space of the fuel filter. The suction port of the fuel pump may be positioned in the internal space of the fuel filter, and the discharge port of the fuel pump may protrude outside the internal space of the fuel filter.

In this fuel pump unit, since the fuel pump is substantially accommodated within the internal space of the fuel filter, it is possible to increase the filtration area of the fuel filter.

In one embodiment of the present teachings, the discharge port of the fuel pump may protrude from one end of the fuel pump. Preferably, the fuel filter is fitted to the discharge port of the fuel pump. In this fuel pump unit, it is possible to accommodate substantially the whole body of the fuel pump within the fuel filter, with the exception of the discharge port. This makes it possible to enlarge the filtration area of the fuel filter.

In another embodiment of the present teachings, the discharge port of the fuel pump may be formed at one end of the fuel pump. Preferably, the fuel filter is fitted to the end on the side where the discharge port of the fuel pump is formed. In this fuel pump unit too, substantially the whole body of the fuel pump can be accommodated inside the fuel filter.

In another aspect of the present teachings, the fuel pump may further comprise a vapor discharge pipe. The vapor discharge pipe may protrude from one end of the fuel pump. The fuel filter may be fitted to the vapor discharge pipe. The tip of the vapor discharge pipe is preferably positioned outside the fuel filter.

In this fuel pump unit, the fuel filter is fitted to the fuel pump using the vapor discharge pipe. Because the tip of the vapor discharge pipe is positioned outside the fuel filter, any vapor that is discharged from the fuel pump is prevented from being sucked back into the fuel pump again.

In another aspect of the present teachings, it is preferable that the frame is divisible (separable) into at least two pieces. This makes it easy to fit the fuel filter to the fuel pump. For example, the frame preferably comprises a first frame, a second frame, and a hinge that enables the second frame to open and close relative to the first frame. This structure makes it possible to accommodate the fuel pump inside the fuel filter by fitting the filter to the pump with the second frame open relative to the first, and then closing the same. The first frame, the second frame, and the hinge may be molded together as a single body.

In another aspect of the present teachings, a fuel supply apparatus may comprise the abovementioned fuel pump unit and a high-pressure filter. The high-pressure filter further filters fuel delivered by the fuel pump unit and supplies it to the outside. The fuel pump unit may be disposed inside the fuel tank. The fuel filter of the fuel pump unit is preferably fitted to the fuel tank via the high-pressure filter.

The fuel supply apparatus may be set up in a fuel tank having a reserve cup, so that the fuel pump unit sucks in and discharges fuel from inside the reserve cup. In this case, it is preferable that the high-pressure filter is fitted to the fuel tank via the reserve cup.

By means of this fuel supply apparatus, any vibrations produced by the operation of the fuel pump are transmitted to the fuel tank via a lengthy route, as follows: fuel pump→fuel filter→high-pressure filter→reserve cup→fuel tank. This lengthy transmission route greatly attenuates the vibrations, and enables a reduction in the operating noise of the fuel pump.

These features may be utilized singularly or, in combination, in order to make improved fuel pump units. In addition, other objects, features and advantages of the present teachings will be readily understood after reading the following detailed description together with the accompanying drawings and claims. Of course, the additional features and aspects disclosed herein also may be utilized singularly or, in combination with the above-described features.

DESCRIPTION OF THE PREFERRED EMBODIMENTS (First Representative Embodiment)

Figure 1:
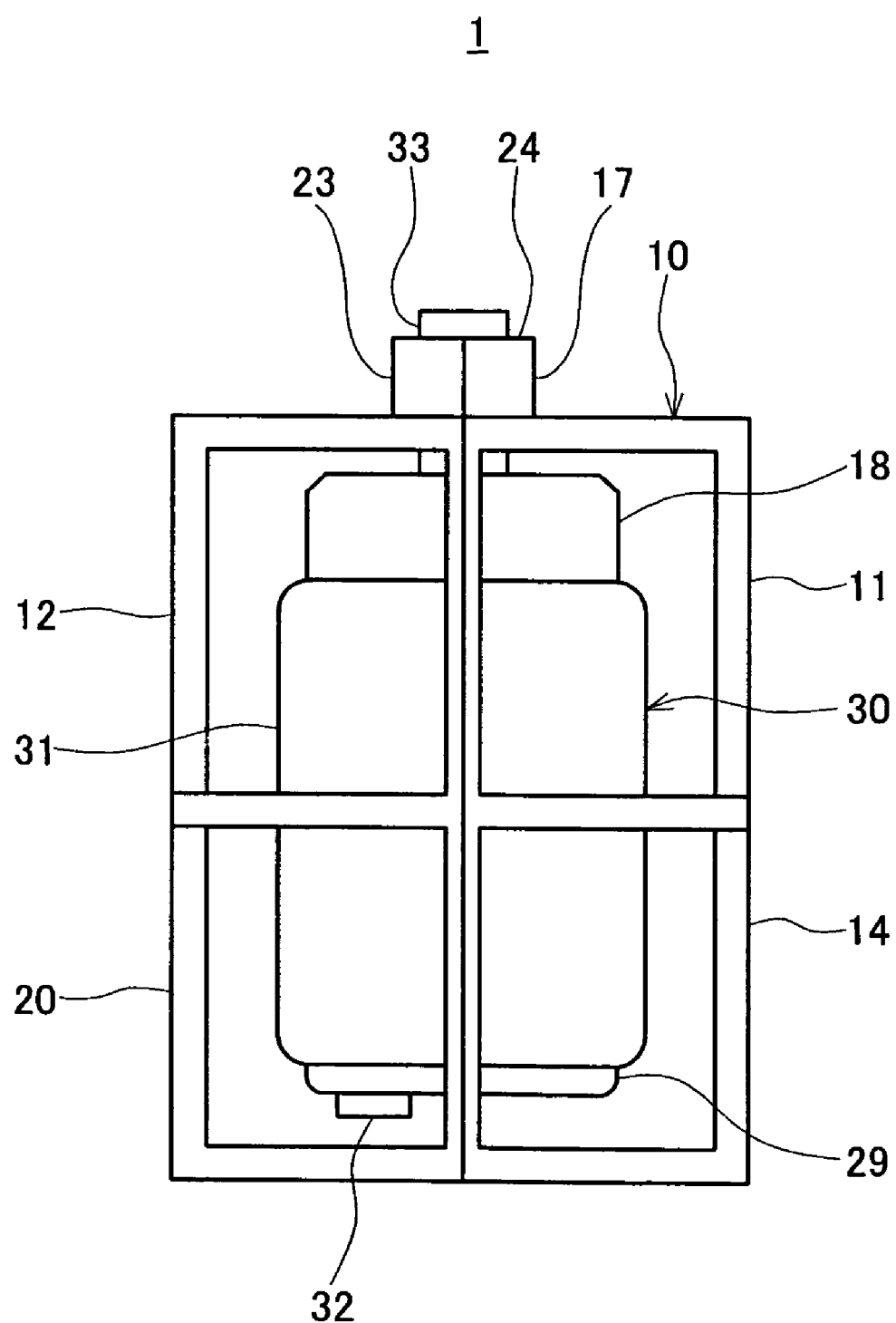
FIG. 1 is a side view of a fuel pump unit according to a first representative embodiment of the present teachings.

Fuel pump unit 1 according to a first representative embodiment of the present teachings will be explained with reference to the drawings. As shown in FIG. 1, fuel pump unit 1 comprises fuel filter 10 and fuel pump 30 that is accommodated inside fuel filter 10. Fuel pump unit 1 is disposed inside a reserve cup provided at the bottom of the fuel tank of the vehicle, and is immersed in fuel of the fuel tank.

Figure 2:
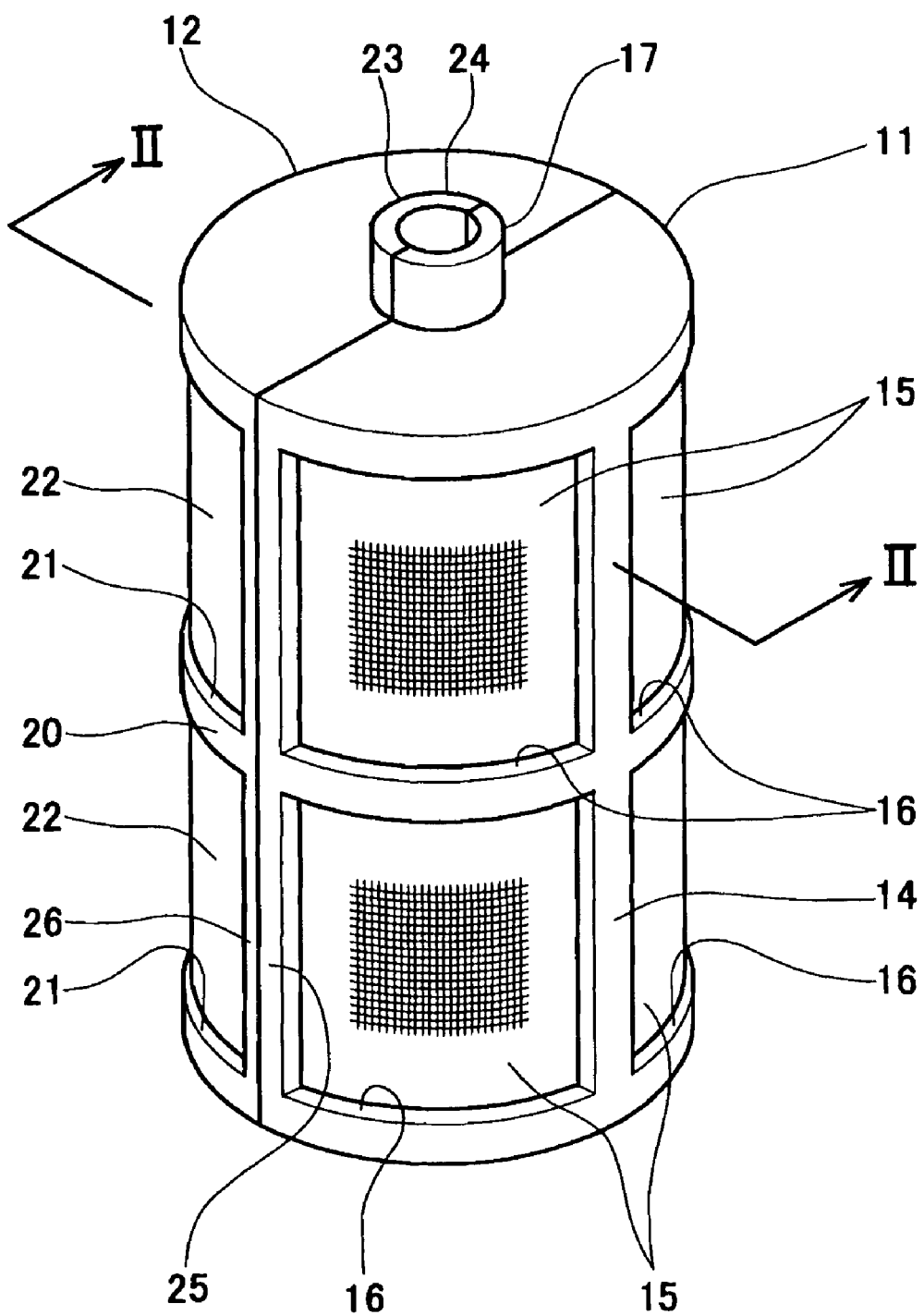
FIG. 2 is a perspective view of a fuel filter of the first representative embodiment.

First, fuel filter 10 will be explained. As shown in FIG. 2, fuel filter 10 is substantially cylindrical in external shape. Fuel filter 10 comprises first filter 11 and second filter 12. First filter 11 comprises first frame 14 and filters 15. Filters 15 comprise a mesh skeleton (not shown) and sheets of filter material (e.g., non-woven material) fitted onto the skeleton. First frame 14 is provided with four openings 16. Filter 15 seals opening 16. A half-cylinder 17 is formed at the top of first frame 14.

Second filter 12 has the same structure as first filter 11, the filters 22 sealing the openings 21 formed on second frame 20. A half-cylinder 23 is formed at the top of second frame 20. A cylindrical outlet 24 is formed by the half-cylinder 17 of first frame 14 and the half-cylinder 23 of second frame 20. The frames 14 and 20 are made of resin material (e.g., plastic).

Figure 3:
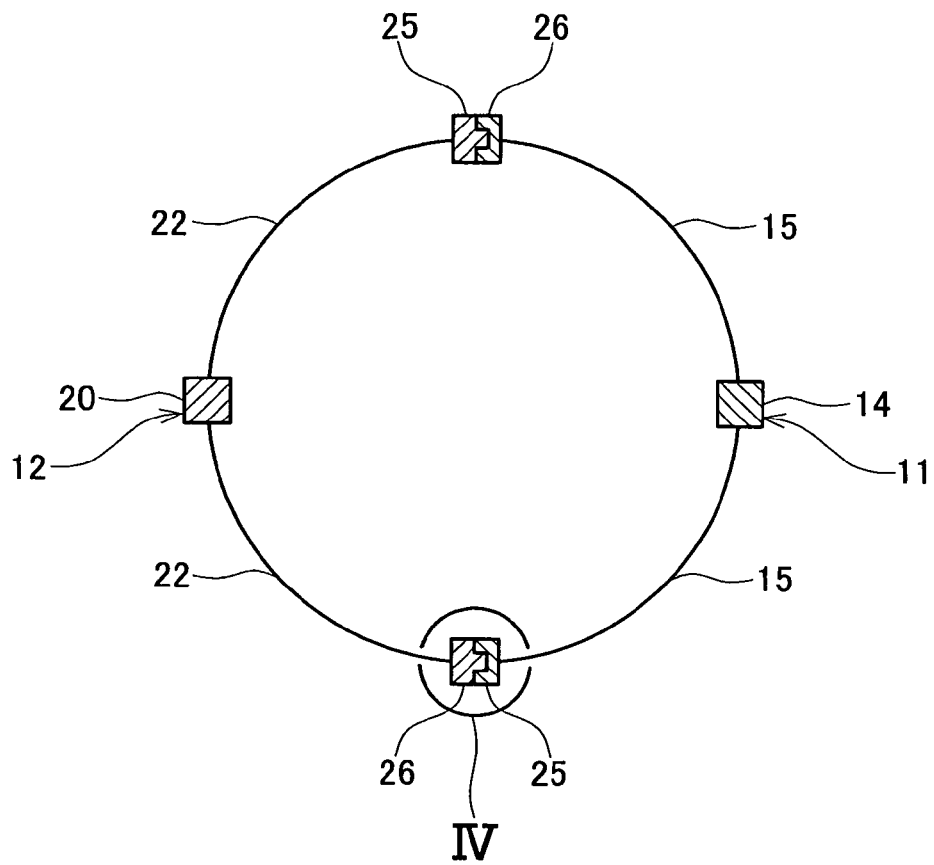
FIG. 3 is a cross-section taken along a line II—II within FIG. 2.
Figure 4:
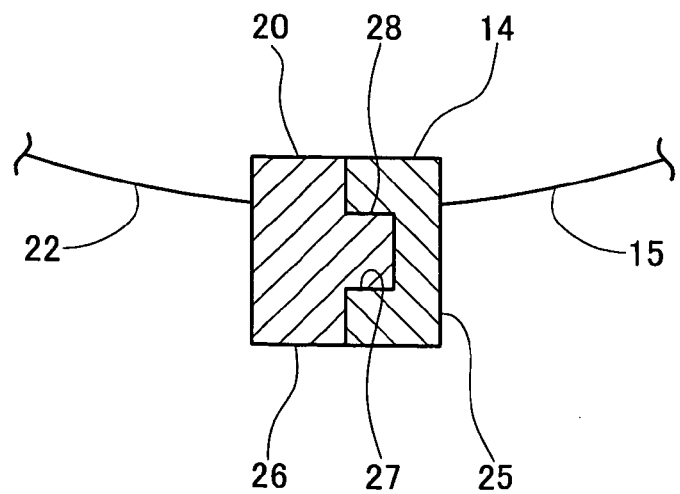
FIG. 4 is a detailed view of part IV within FIG. 3.
Figure 5:
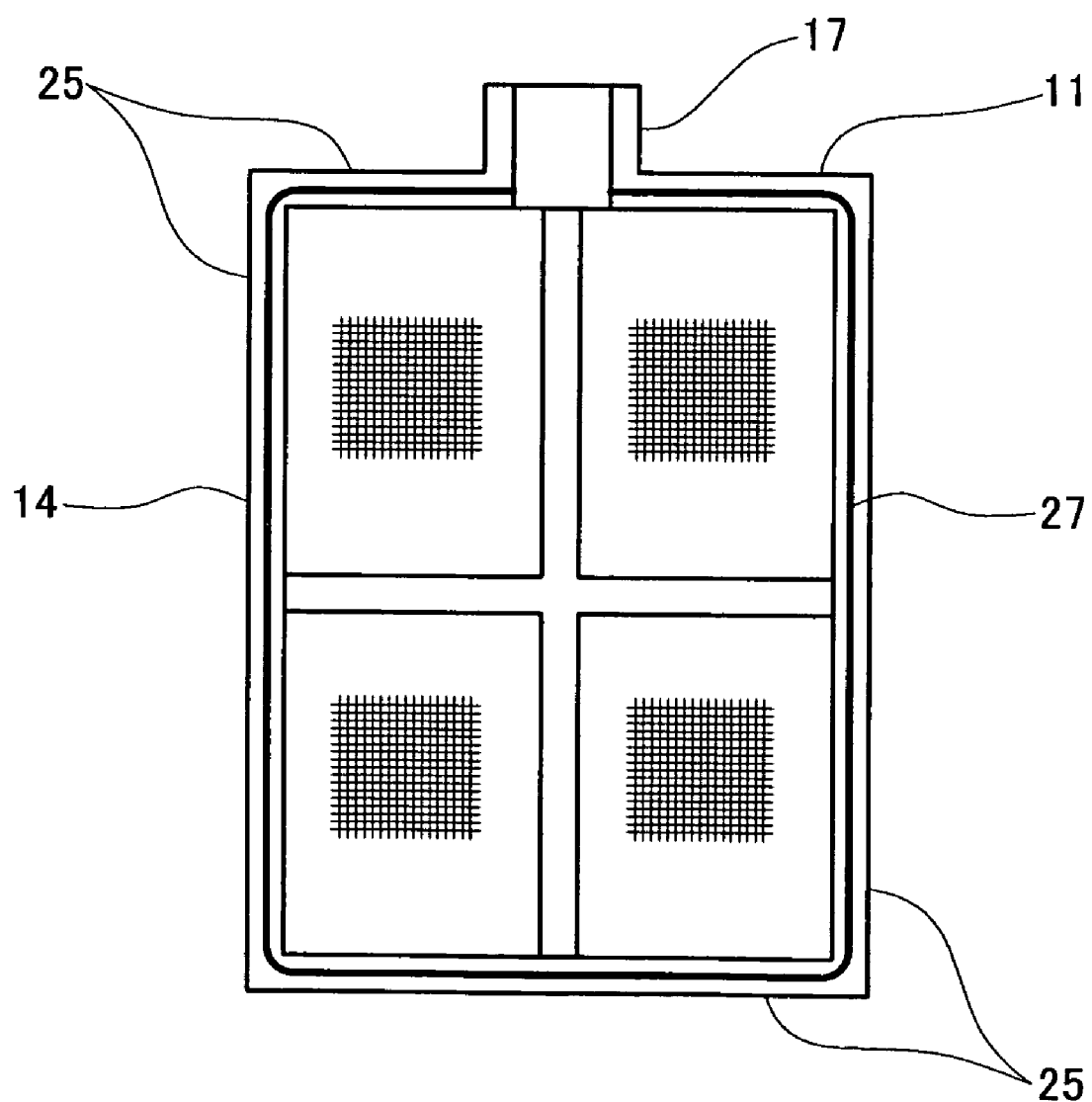
FIG. 5 is a diagram showing the inside of a first filter of the first representative embodiment.
Figure 6:
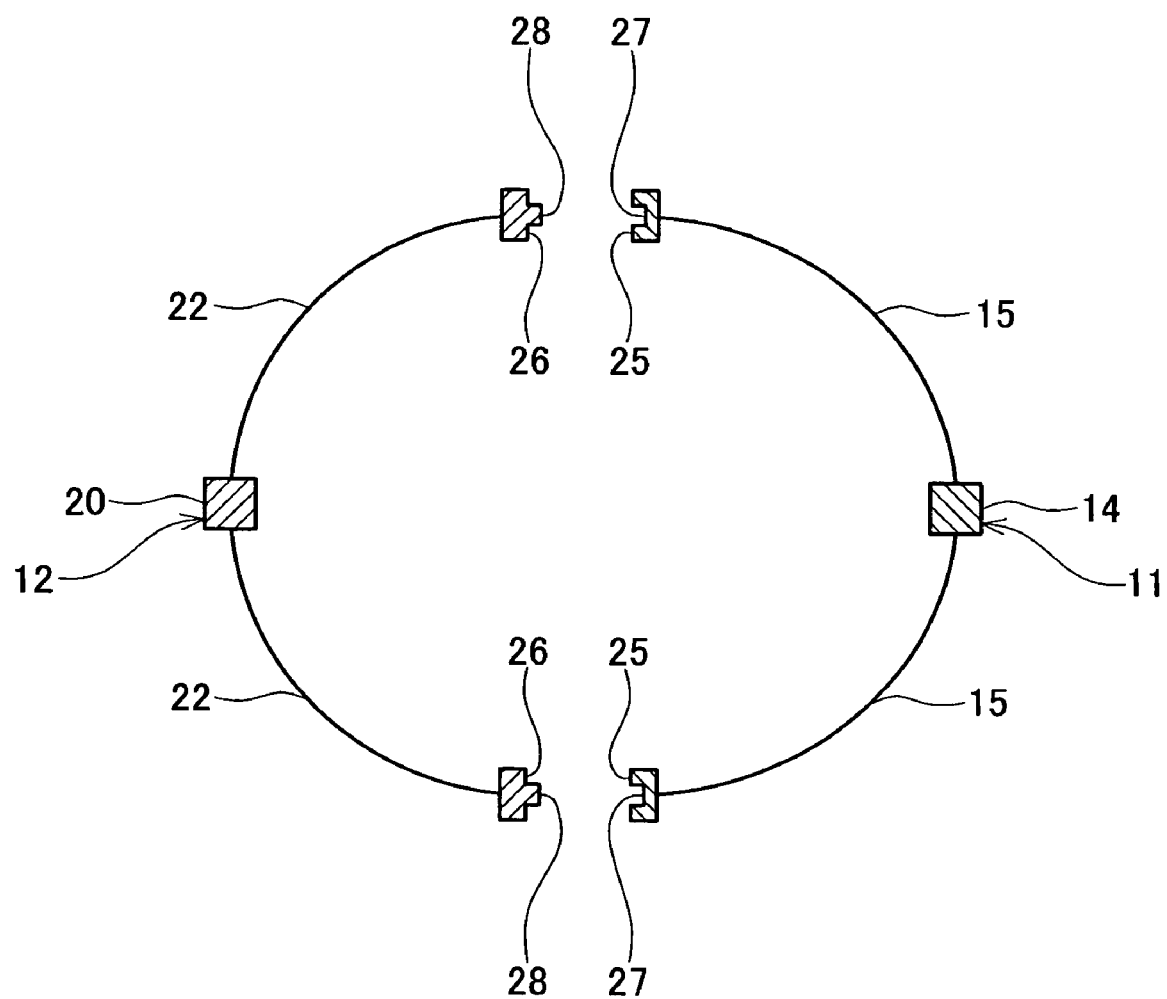
FIG. 6 is a cross-section showing a state in which the fuel filter of the first representative embodiment has been divided in two.

As shown in FIG. 3, the side edge 25 of first frame 14 and the side edge 26 of second frame 20 are joined together. As shown in FIG. 4, the side edge 25 of first frame 14 is formed with recess 27. As shown in FIG. 5, recess 27 extends continuously in a longitudinal direction along the side edge 25, excepting the inner circumference of the half-cylinder 17. As shown in FIG. 4, ridge 28 is formed on the side edge 26 of second frame 20. This ridge 28 extends in a longitudinal direction along the side edge 26, in the same way as the recess 27 on the first frame 14. The ridge 28 is forcibly inserted into the recess 27, and the two are bonded together. This bonding of the ridge 28 and the recess 27 means that first filter 11 and second filter 12 are joined together and are fixed in a sealed state. FIG. 6 shows a state in which the bond between first frame 14 and second frame 20 has been released (and in which fuel filter 10 has been removed).

Figure 7:
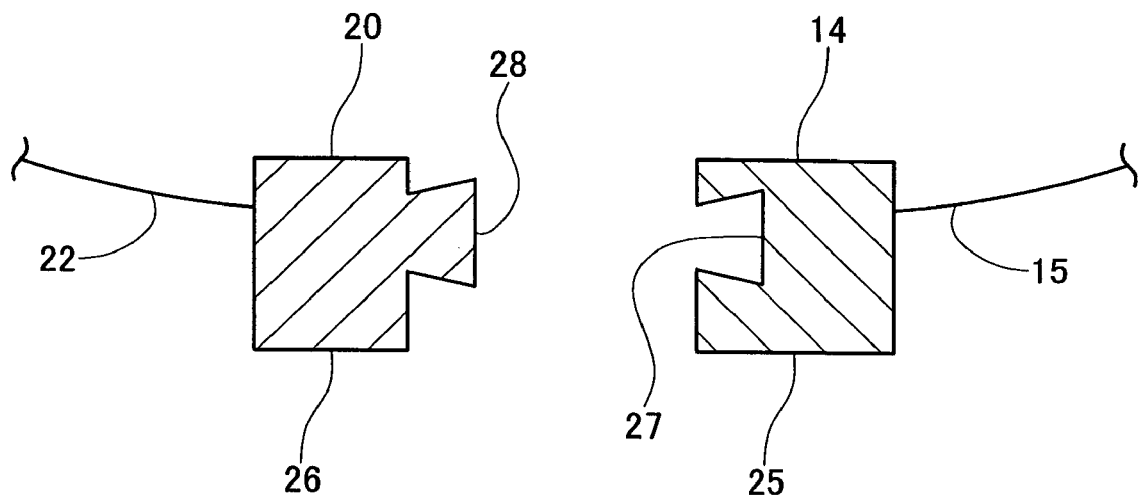
FIG. 7 is a cross-section showing a state in which the bonded parts of the fuel filter have been separated.
Figure 8:
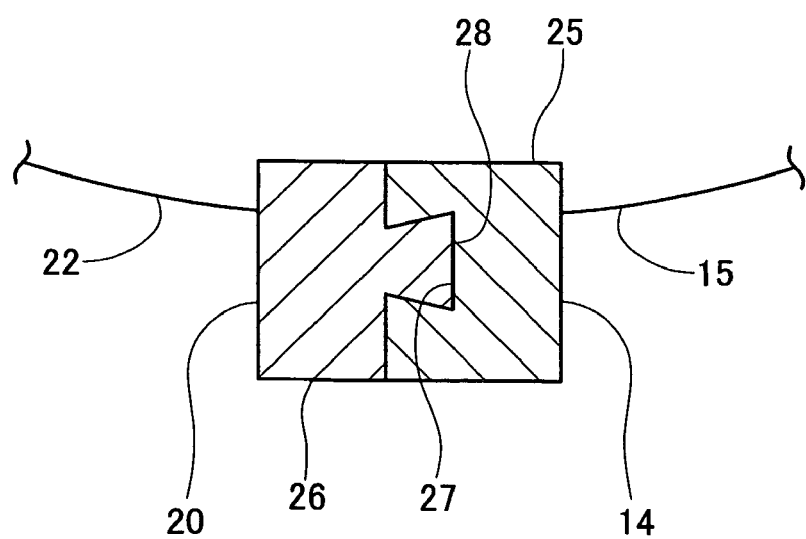
FIG. 8 is a cross-section showing a state in which the bonded parts of the fuel filter in FIG. 7 have been bonded together.

As shown in FIG. 7, it is possible to form the ridge 28 along the side edge 26 so that in cross-section its base is narrower than its tip. The recess 27 of the side edge 25 is then formed so as to have a cross-sectional shape that matches the ridge 28. In this way, when first filter 11 and second filter 12 are joined together, the ridge 28 and the recess 27 bond and deform to fit together. FIG. 8 shows a state in which the ridge 28 and the recess 27 are bonded together. Giving the ridge 28 and the recess 27 this shape ensures that first filter 11 and second filter 12 are fitted together more securely. The seal between the joined parts of first filter 11 and second filter 12 (i.e., the contact parts between the side edge 25 of first frame 14 and the side edge 26 of second frame 20) is also improved.

Figure 9:
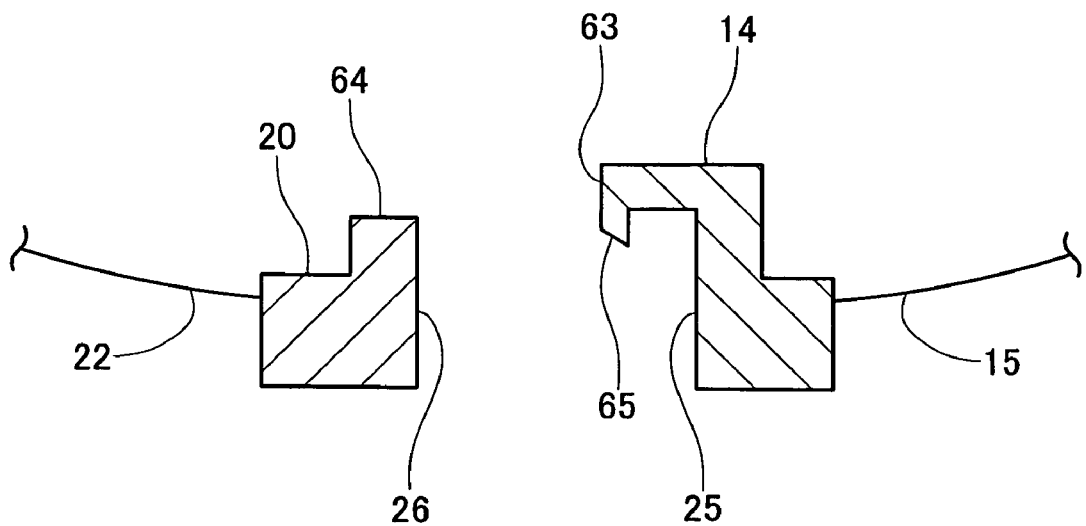
FIG. 9 is a cross-section showing a state in which the bonded parts of the fuel filter have been separated.
Figure 10:
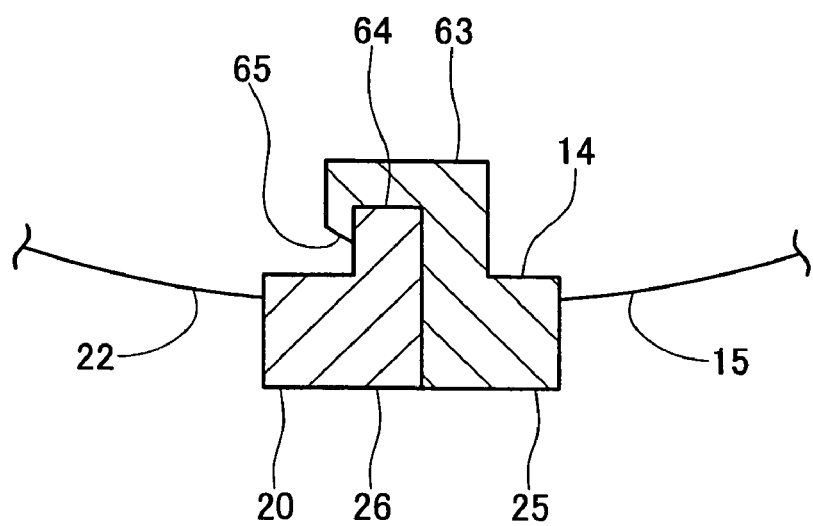
FIG. 10 is a cross-section showing a state in which the bonded parts of the fuel filter in FIG. 9 have been bonded together.

Further, as shown in FIG. 9, it is possible to form a hook 63 on the side edge 25, and a hook receiving portion 64 on the side edge 26. The hook 63 is formed with a slanted face 65. When first filter 11 and second filter 12 are joined together, the slanted face 65 of the hook 63 abuts the hook receiving portion 64, and the hook 63 fits over the hook receiving portion 64. When the hook 63 fits over the hook receiving portion 64, as shown in FIG. 10, the hook 63 latches immovably onto the hook receiving portion 64. This structure also ensures that first filter 11 and second filter 12 are fixed firmly together, and that the seal at the point of contact between the side edge 25 and the side edge 26 is secure.

Figure 11:
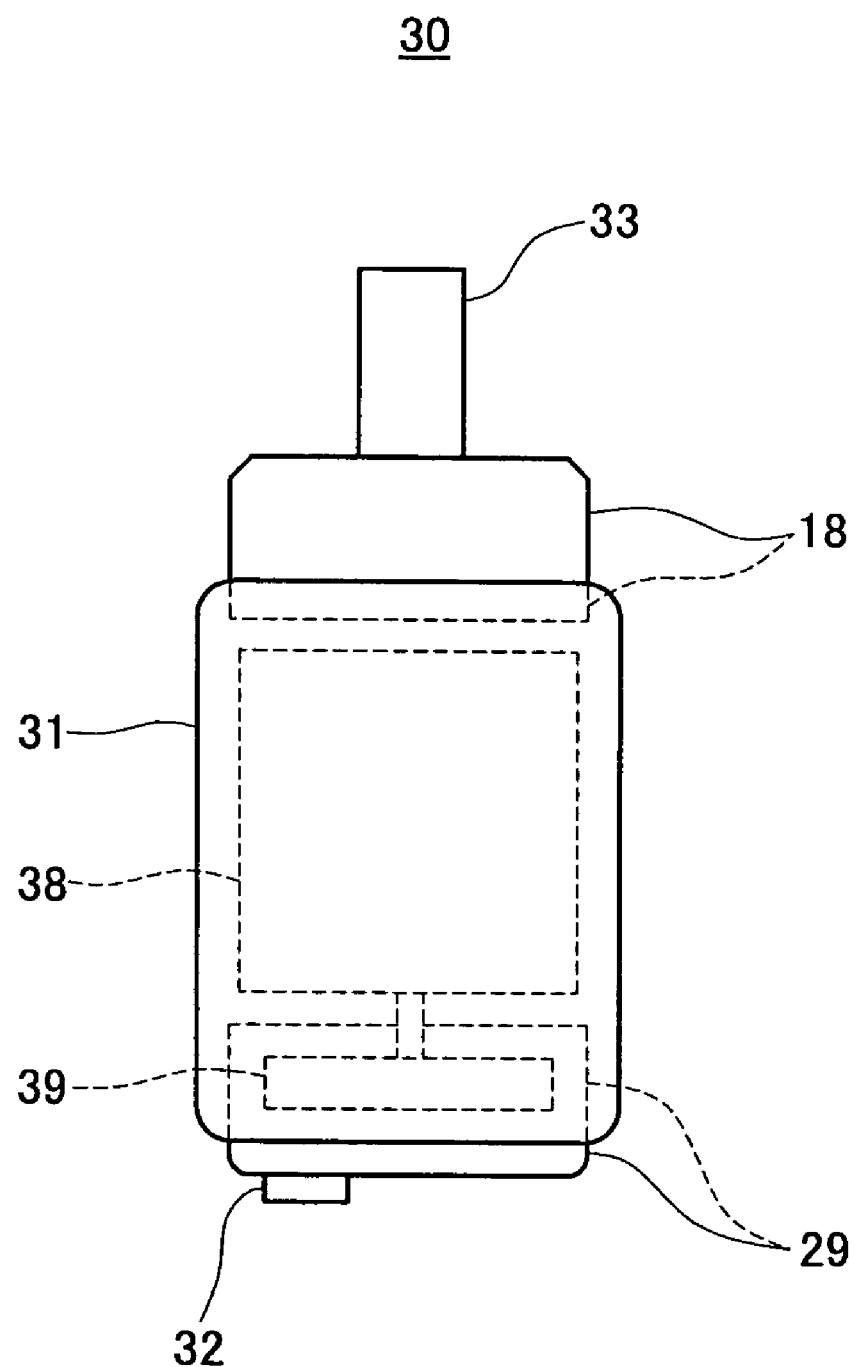
FIG. 11 is a side view of the fuel pump of the first representative embodiment.

As shown in FIG. 11, fuel pump 30 comprises housing 31, motor 38, a lower body 29, impeller 39, and an upper body 18. Housing 31 is cylindrical in shape, and accommodates motor 38. The lower body 29 is fixed to the bottom of housing 31. The suction port 32 is provided on the lower body 29. Impeller 39 is substantially disk-shaped, and is rotatably accommodated inside the lower body 29. Motor 38 drives the rotation of impeller 39. The upper body 18 is fixed to the top of housing 31. In the upper body 18 are provided the discharge port 33, which protrudes upward, and an electrical connector (not shown in the diagram). The electrical connector is supplied with electricity from an external power source.

When electricity is supplied to the electrical connector, the motor 38 causes the impeller 39 to rotate. When impeller 39 rotates, fuel is sucked in from the suction port 32. The fuel sucked in from the suction port 32 is pressurized by the rotation of impeller 39, and then flows through inside housing 31 and is discharged through the discharge port 33.

Figure 12:
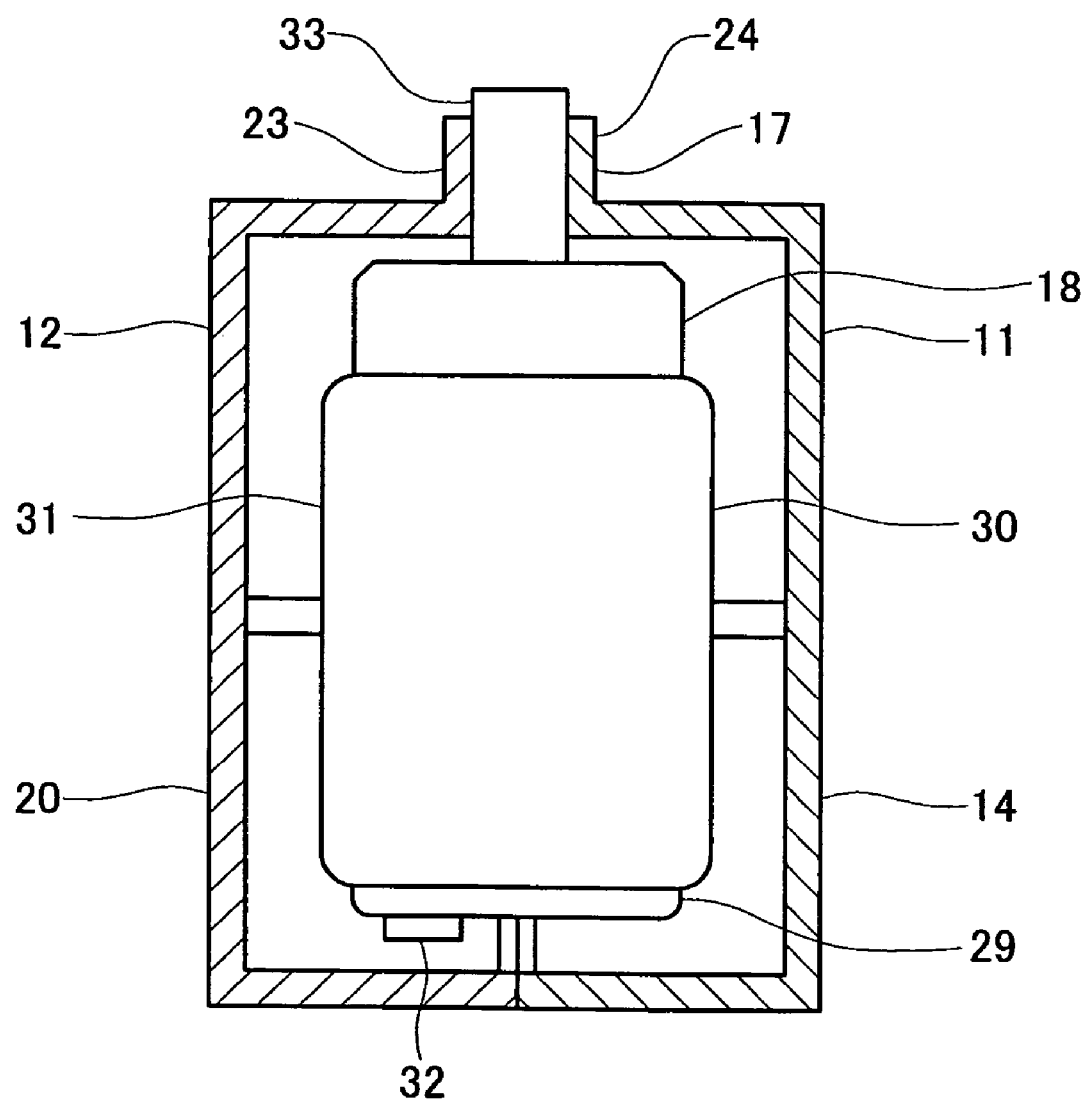
FIG. 12 is a cross-section of an example of the fuel pump unit of the first representative embodiment.

As explained above, the outlet 24 of fuel filter 10 is formed from the half-cylinder 17 of first frame 14 and the half-cylinder 23 of second frame 20. The dimensions of the inner diameter of the outlet 24 are slightly smaller than those of the external diameter of the discharge port 33 of fuel pump 30. Consequently, as shown in FIG. 12, when first filter 11 and second filter 12 are joined together, the outlet 24 of fuel filter 10 is attached (fitted) to the discharge port 33 of fuel pump 30. By means of this structure, the discharge port 33 of fuel pump 30 is clinched tight by the outlet 24 of fuel filter 10.

Figure 13:
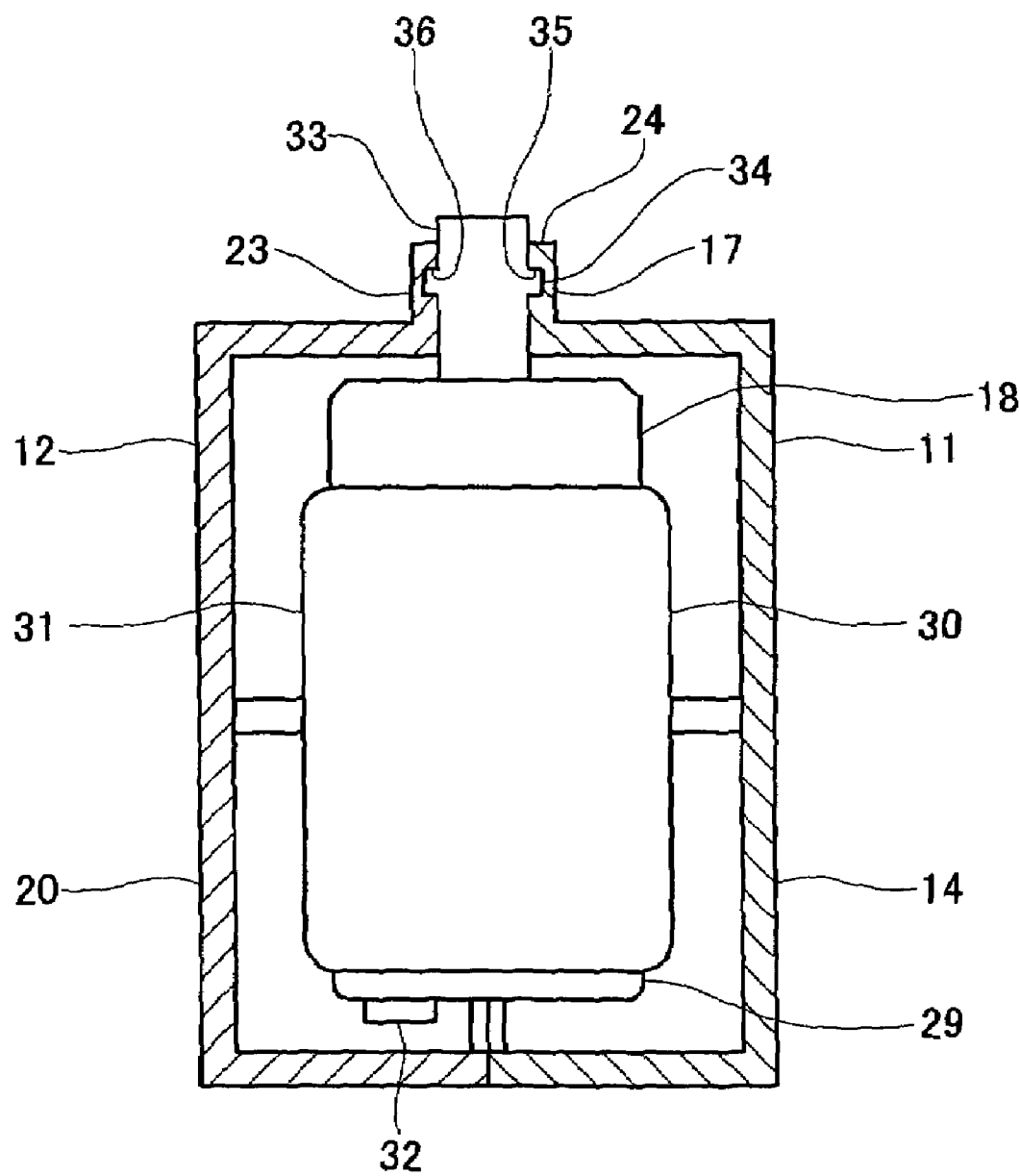
FIG. 13 is a cross-section of another example of the fuel pump unit of the first representative embodiment.

As shown in FIG. 13, it is also possible to form a ridge 34 that continues in a circumferential direction around the discharge port 33 of fuel pump 30. An indentation 35 is then formed that extends in a circumferential direction around the inner circumference of the half-cylinder 17 of first frame 14, and another indentation 36 formed that extends in a circumferential direction around the inner circumference of the half-cylinder 23 of second frame 20. This structure means that when first filter 11 and second filter 12 are joined together, the ridge 34 of the discharge port 33 bonds with the indentation 35 of the half-cylinder 17 and the indentation 36 of the half-cylinder 23, attaching fuel filter 10 more securely to fuel pump 30.

Figure 14:
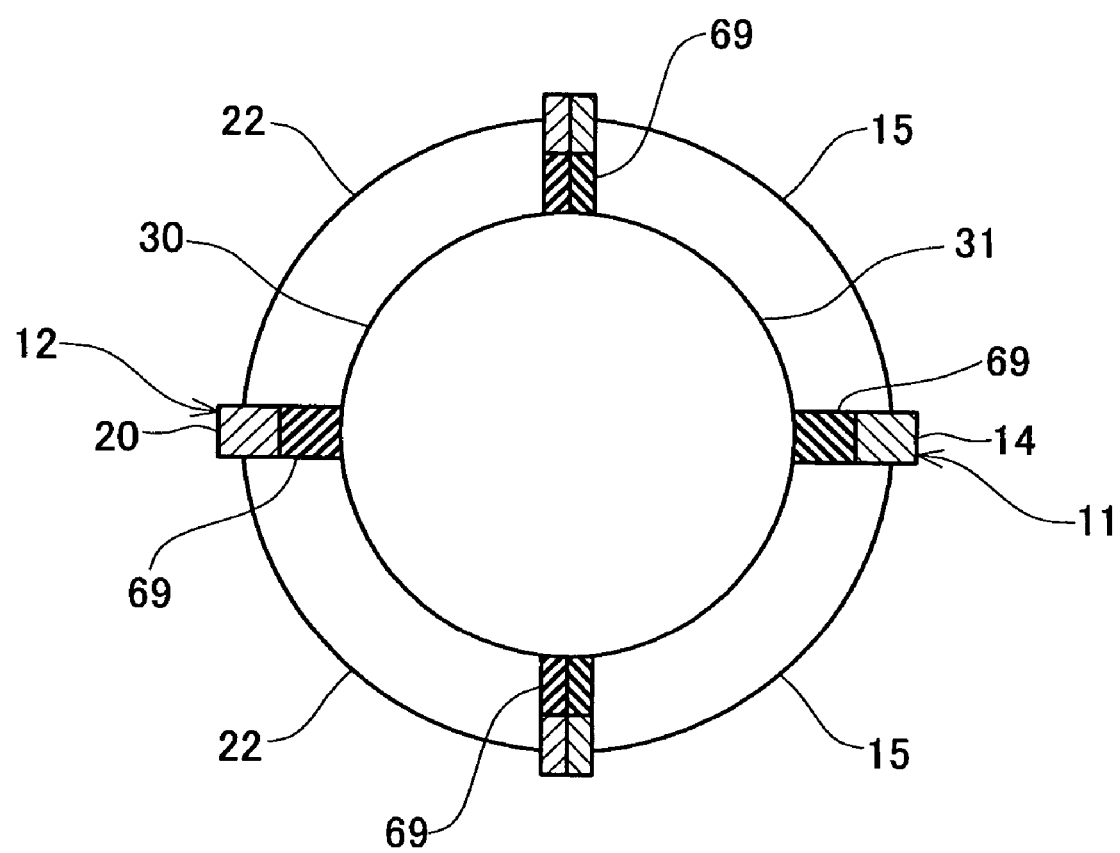
FIG. 14 is a cross-section taken perpendicular to the axial direction of the fuel pump unit of the first representative embodiment.

As shown in FIG. 14, it is also possible to provide projections 69 on first frame 14 of first filter 11 and second frame 20 of second filter 12, that extend inward to touch housing 31 of fuel pump 30. These projections 69 mean that fuel pump 30 is attached in a more stable position to fuel filter 10. The projections 69 also help to prevent any deformation or crumpling of frames 14 and 20.

Fuel filter 10 according to the first representative embodiment enables a larger filtration area than that allowed by conventional fuel filter.

Figure 15:
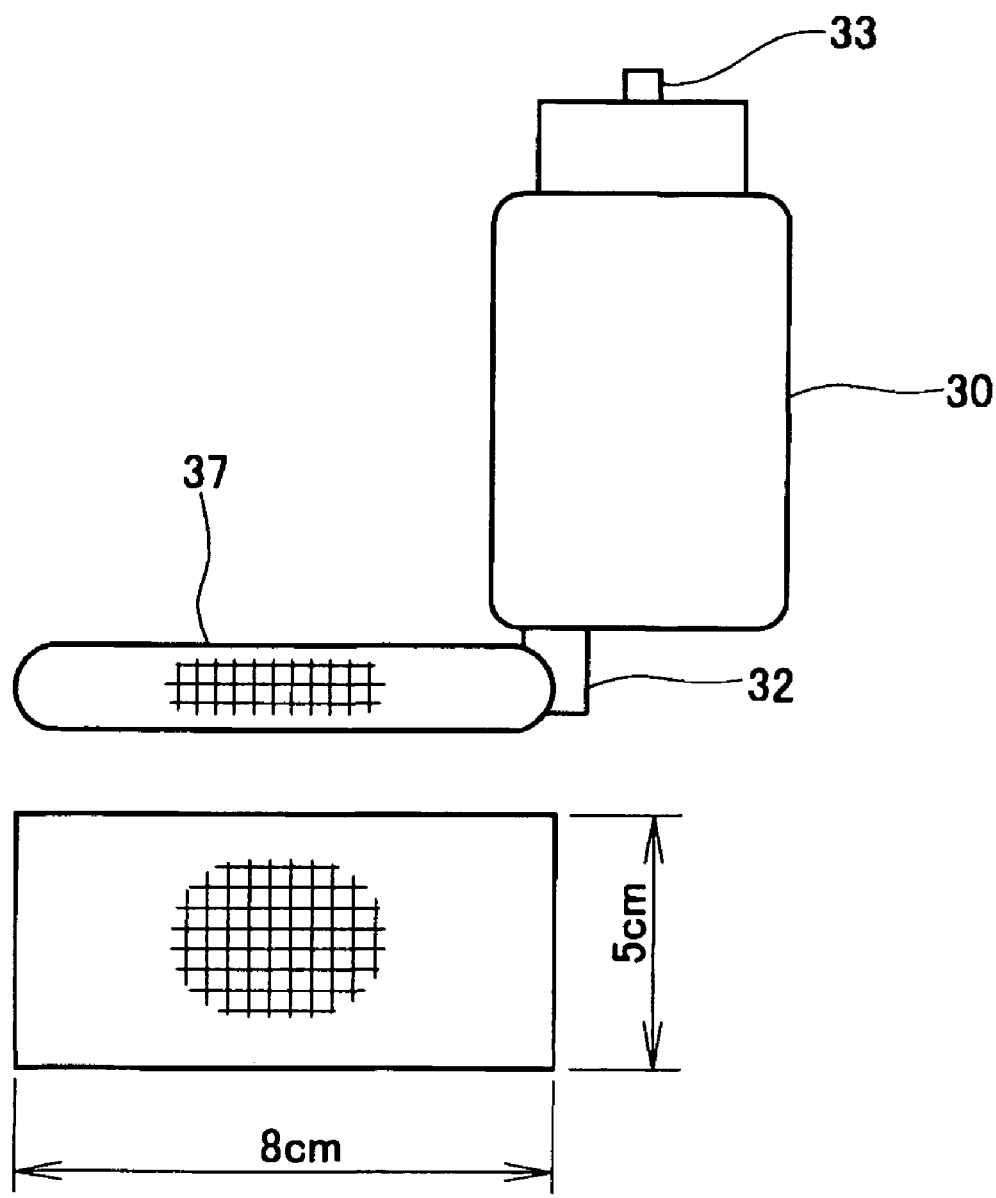
FIG. 15 shows the dimensions of a fuel filter used in a conventional fuel pump unit.

In the past, as shown in FIG. 15, a flat fuel filter 37 was connected to the suction port 32 of the fuel pump 30. The fuel pump 30 and the fuel filter 37 are accommodated inside the reserve cup of the fuel tank. For this reason, the size of the fuel filter 37 is limited by the space available inside the reserve cup, and cannot be made any larger than these limits allow. Additionally, enlarging the fuel filter 37 makes it more difficult to handle when fixing the fuel pump 30 (with the fuel filter 37) to the reserve cup of the fuel tank. As shown in FIG. 15, the standard surface dimensions of the fuel filter 37 are approximately 5 cm×8 cm. In this case, the filtration area would be as follows:

$$5 \times 8 \times 2 = 80 \text{ cm}^2$$

Figure 16:
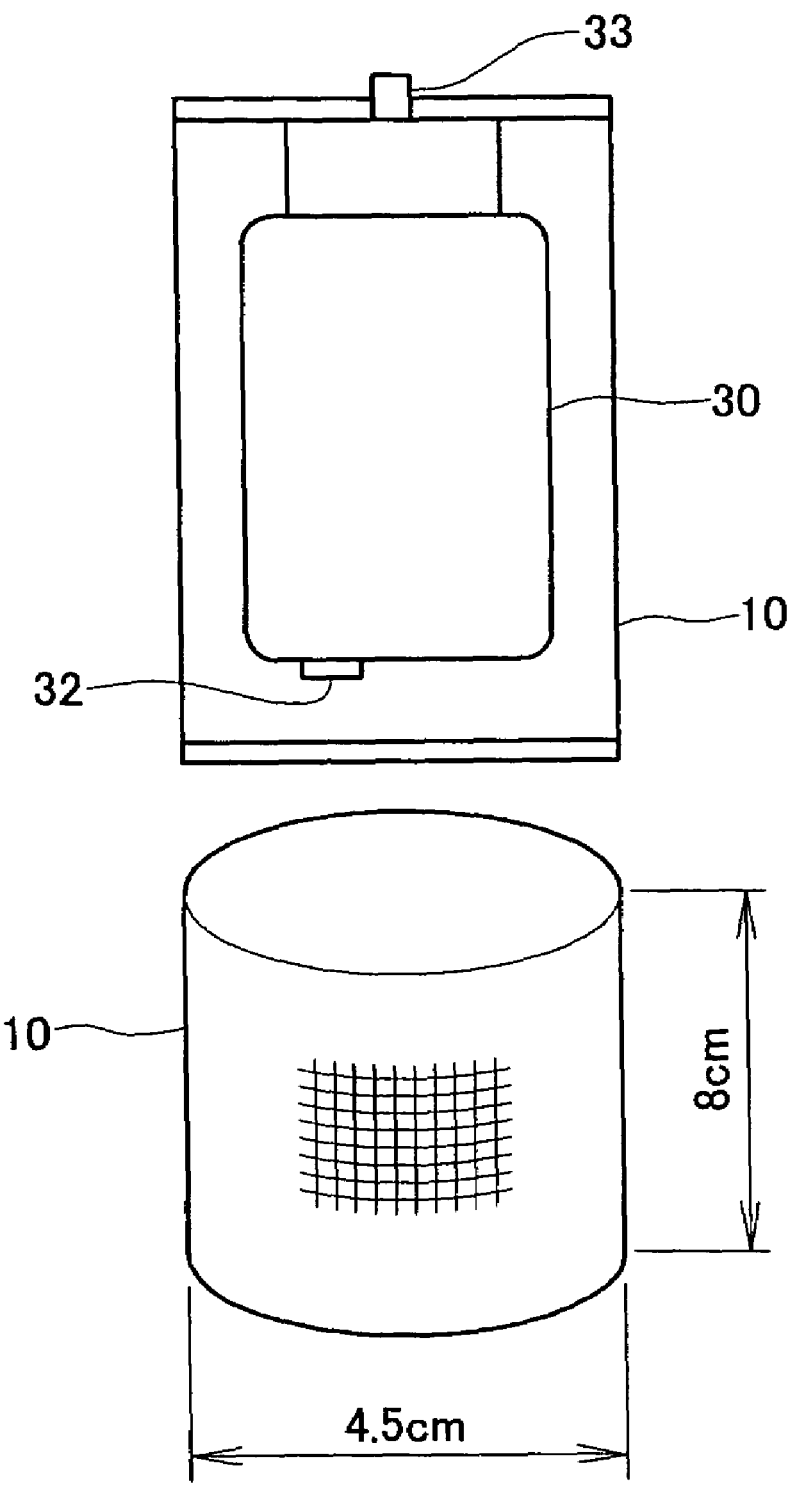
FIG. 16 shows the dimensions of the fuel filter within the fuel pump unit of the first representative embodiment.

As shown in FIG. 16, if the fuel filter of the first representative embodiment is given a diameter of 4.5 cm and a height of 8 cm, then the filtration area of the fuel filter 10 will be as follows:

$$4.5 \times p \times 8 = 113 \text{ cm}^2.$$

In this way, the fuel filter 10 according to the first representative embodiment makes possible a filtration area of 113 cm², exceeding that obtained by the conventional fuel filter 37, which could secure a filtration area of only 80 cm². This larger filtration area extends the life of the filter and reduces fluid resistance when the fuel passes through the filter. Lower fluid resistance makes it possible to reduce the amount of electricity consumed by fuel pump 30. Lowering the fluid resistance also makes it possible to reduce negative pressure upstream from the impeller when fuel pump 30 sucks in fuel, limiting vapor production when fuel is at high temperatures. Limiting the amount of vapor produced helps to maintain the efficiency of the fuel pump 30 at higher fuel temperatures.

Also, the fuel filter 10 according to the first representative embodiment is not connected to the suction port 32 of fuel pump 30. For this reason, it is possible to form the suction port 32 of fuel pump 30 into its most desirable shape in terms of hydrodynamics. Consequently, the efficiency of fuel pump 30 is improved.

When the fuel pump sucks in the fuel filtered by the fuel filter, the pressure inside the fuel filter drops below outside pressure. For this reason, vapor is sometimes produced inside the fuel filter when the fuel is at high temperatures. In the conventional fuel filter 37, any vapor produced inside the filter was sucked into the fuel pump 30, as shown in FIG. 15. This greatly reduces the efficiency of the fuel pump 30.

Figure 17:
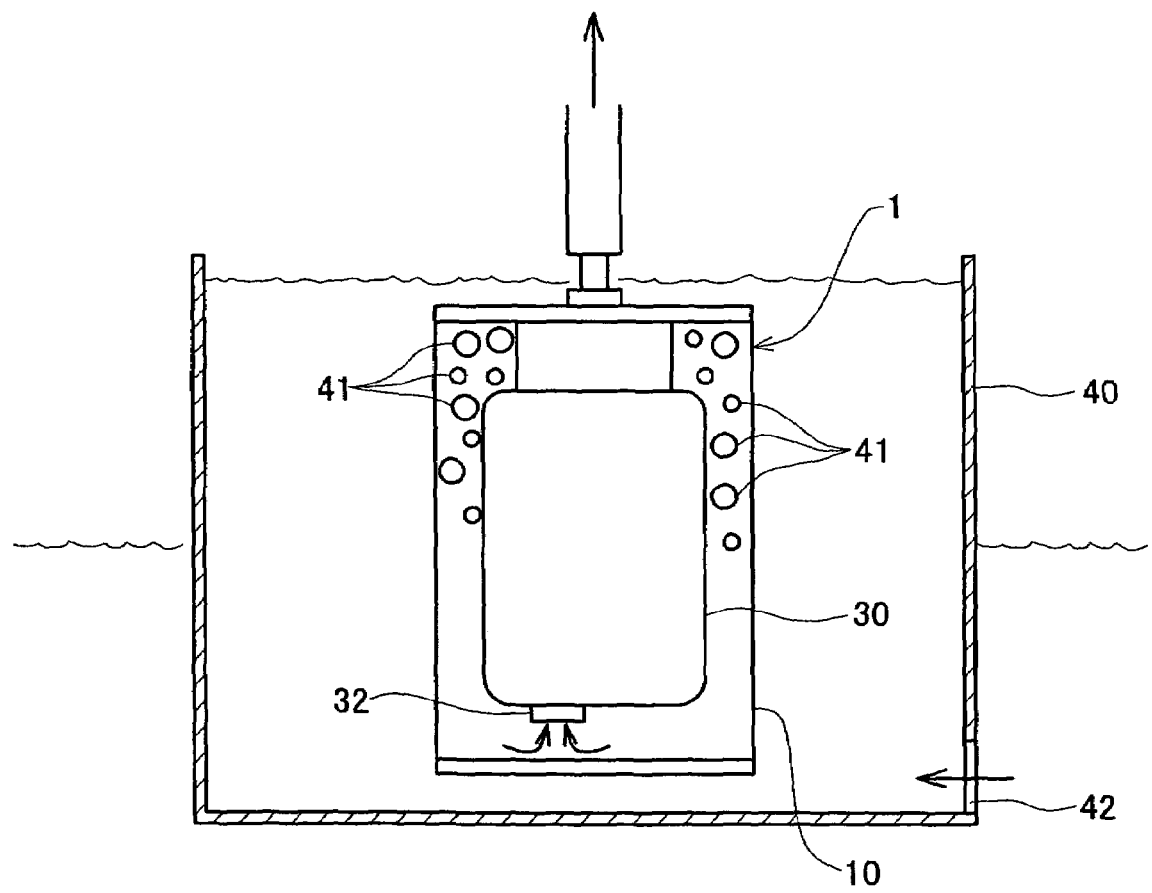
FIG. 17 is a diagram explaining the behavior of vapor inside the fuel pump unit of the first representative embodiment.

FIG. 17 shows a state in which fuel pump unit 1 of the first representative embodiment has been disposed inside the reserve cup 40. A fuel inlet 42 is formed on the bottom side face of the reserve cup 40. Fuel is sent into this fuel inlet 42 by a jet pump (not shown). Even if vapor 41 is produced inside the fuel filter 10, buoyancy means that the vapor 41 will rise to the top of the fuel filter 10 and be discharged to the outside. The suction port 32 of fuel pump 30 is disposed at the bottom of fuel filter 10. Consequently, fuel pump 30 is prevented from sucking in the vapor 41 through the suction port 32.

(Second Representative Embodiment)

The explanation below omits mention of any aspects that overlap with the first representative embodiment, and covers only those aspects specific to this second representative embodiment (the same applies for the explanations that follow of embodiments 3–7).

Figure 18:
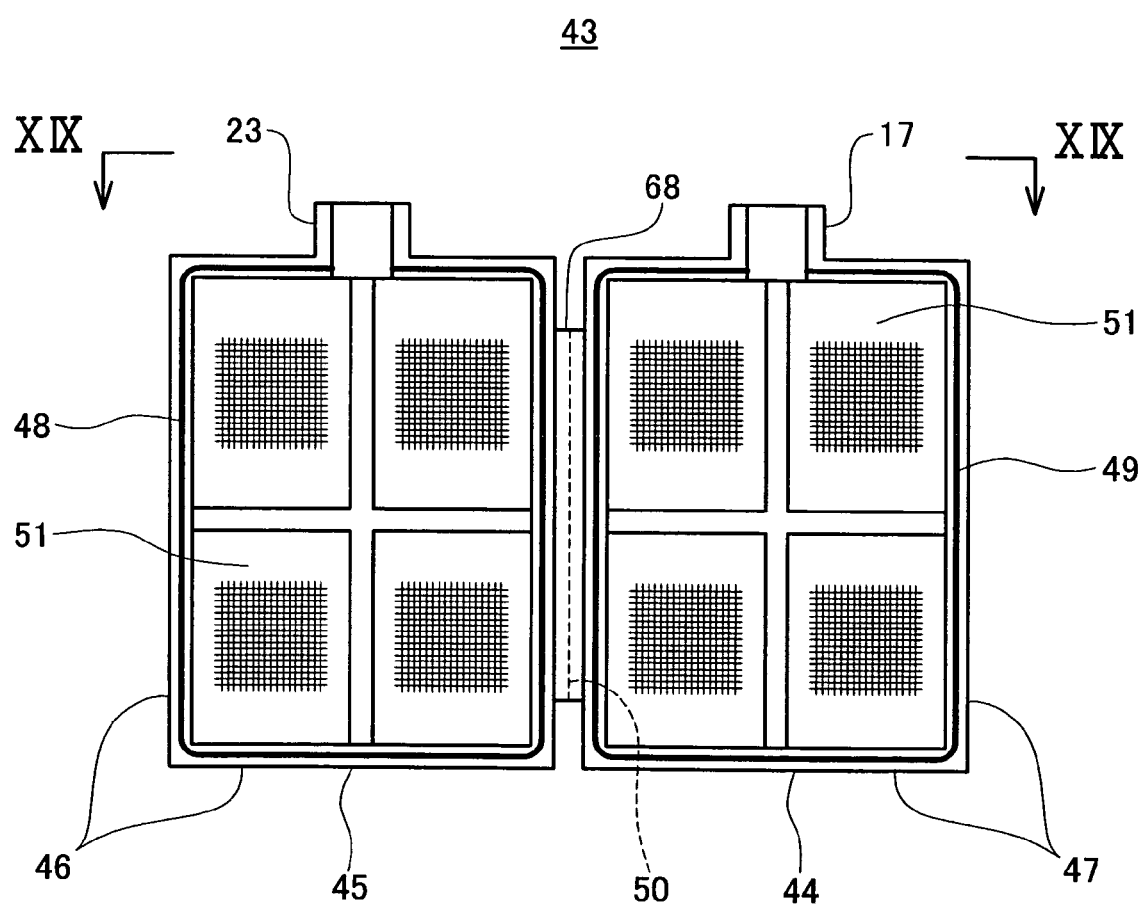
FIG. 18 shows the inside of an example of the fuel filter of a second representative embodiment.
Figure 19:
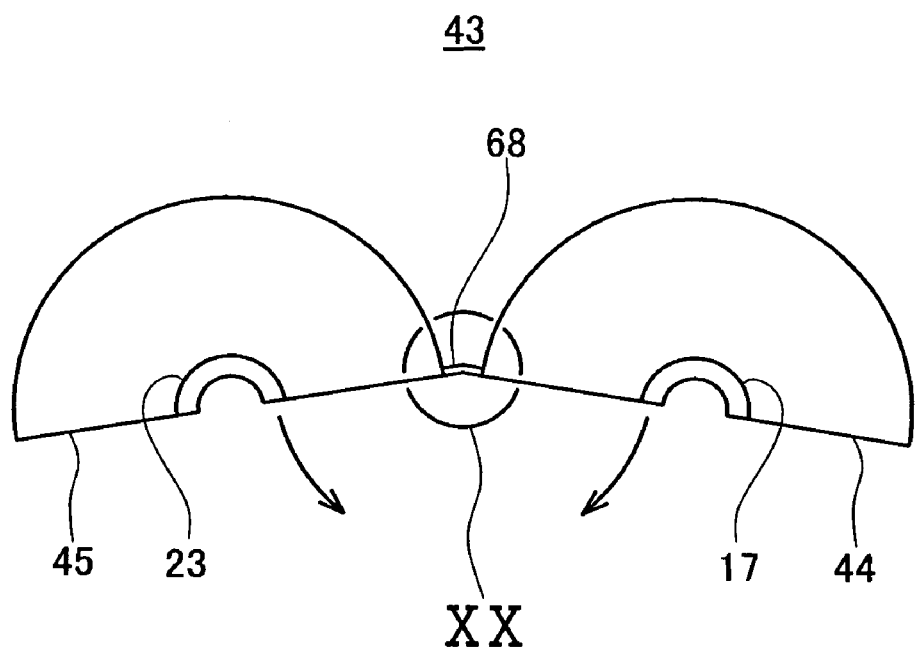
FIG. 19 shows a view along the line XIX—XIX within FIG. 18.

As shown in FIGS. 18 and 19, fuel filter 43 comprises a first frame 44, a second frame 45, a hinge 68, and filters 51. The first frame 44, the second frame 45, and the hinge 68 are made from resin material (e.g., plastic) and are molded together as a single body. A recess 49 is formed on the side edge 47 of the first frame 44, extending longitudinally along the length of the edge. A ridge 48 is formed on the side edge 46 of the second frame 45, extending longitudinally along the length of the edge.

Figure 20:
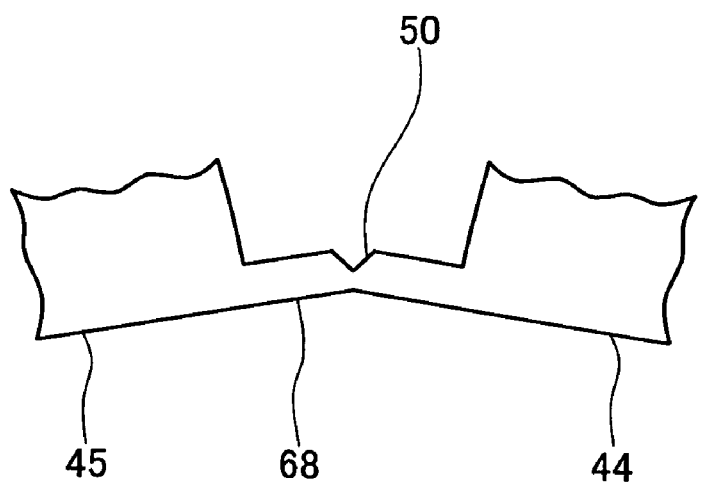
FIG. 20 is a detailed diagram of part XX within FIG. 19.

As shown in FIG. 20, a vertical notch 50 is formed in the hinge 68. Bending the hinge 68 along the notch 50 allows the first frame 44 and the second frame 45 to open and close, centering on the hinge 68. When the fuel filter 43 is closed, the recess 49 of the first frame 44 and the ridge 48 of the second frame 45 are bonded together.

Figure 21:
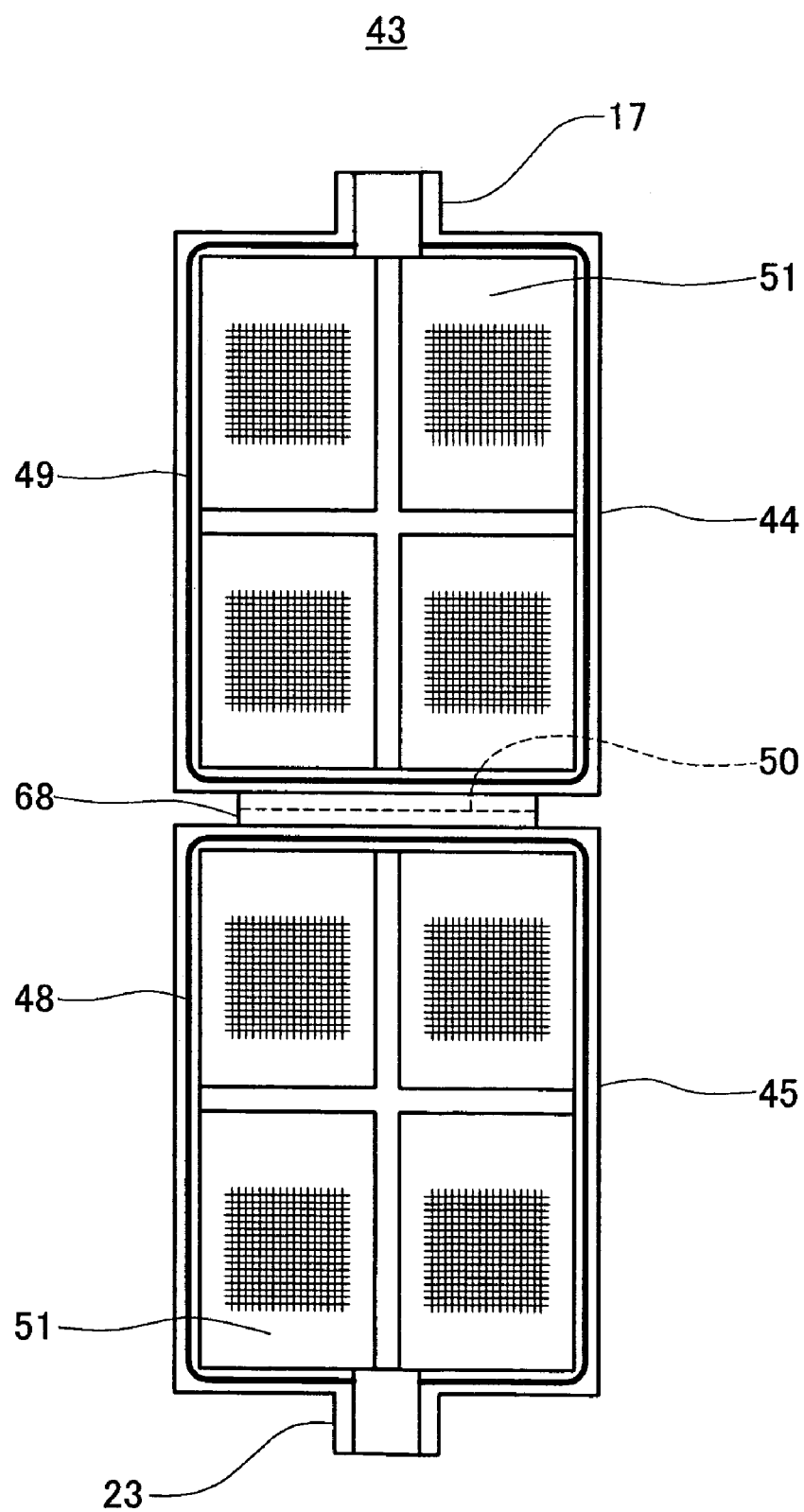
FIG. 21 shows the inside of another example of the fuel filter of the second representative embodiment.

Because the first frame 44, the second frame 45, and the hinge 68 are molded together as a single body, the fuel filter 43 has outstanding productivity. Because of this, it is possible to produce the fuel filter 43 at low cost. Of course, it is also possible to make the first frame 44 and the second frame 45 separately, and then join them together by means of the hinge 68. As shown in FIG. 21, it is also possible to dispose the hinge 68 between the bottom of the first frame 44 and the bottom of the second frame 45.

(Third Representative Embodiment)

Figure 22:
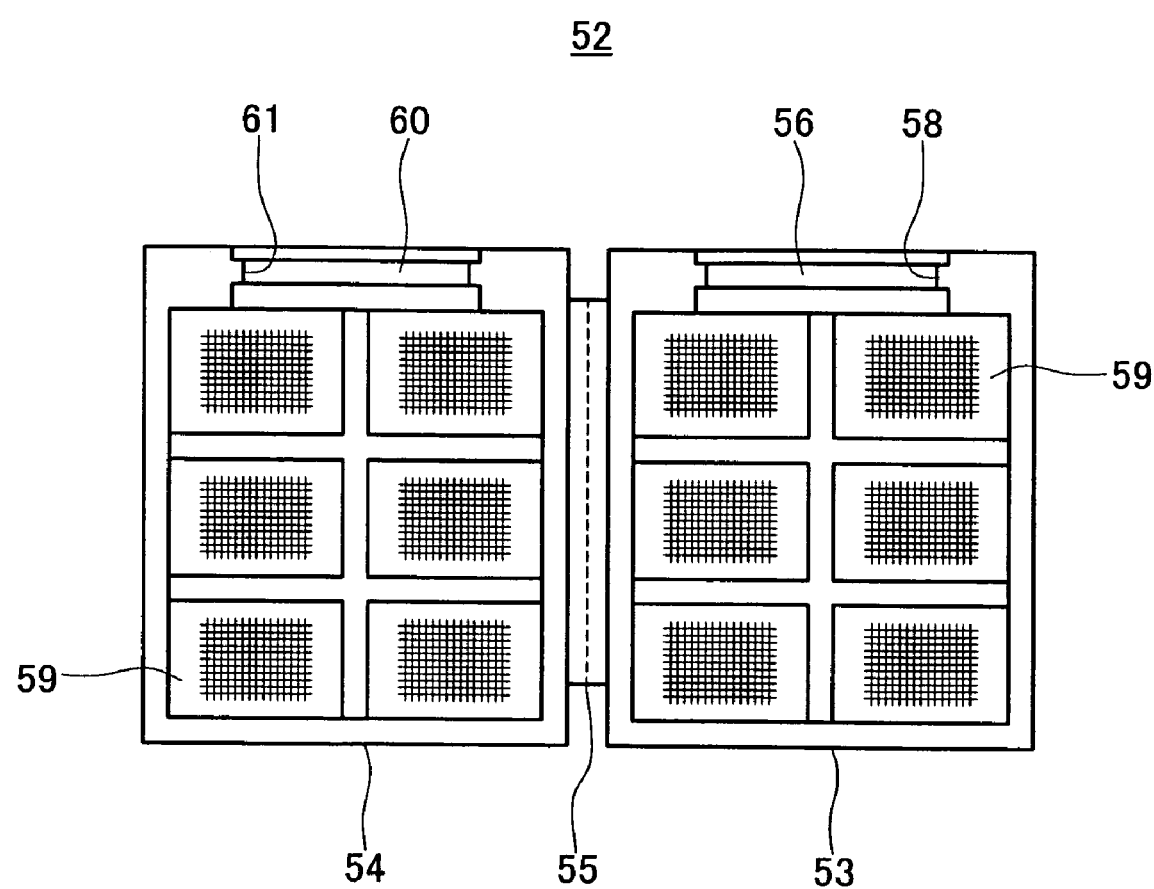
FIG. 22 shows the inside of an example of the fuel filter of a third representative embodiment.

As shown in FIG. 22, the fuel filter 52 comprises a first frame 53, a second frame 54, a hinge 55, and filters 59. The first frame 53, the second frame 54, and the hinge 55 are made of resin material (e.g., plastic) and are molded together as a single body. The fuel filter 52 is opened and closed through rotation of the first frame 53 and the second frame 54 around the hinge 55. When closed, the fuel filter 52 is substantially cylindrical. An opening 56 whose cross-sectional shape is a semi-circular arc is formed in the top part of the first frame 53. The opening 56 is formed with a ridge 58 that extends in a circumferential direction. The top of the second frame 54 is also formed with an opening 60 whose cross-section is a semi-circular arc. The opening 60 is formed with a ridge 61 that runs around its circumference.

Figure 23:
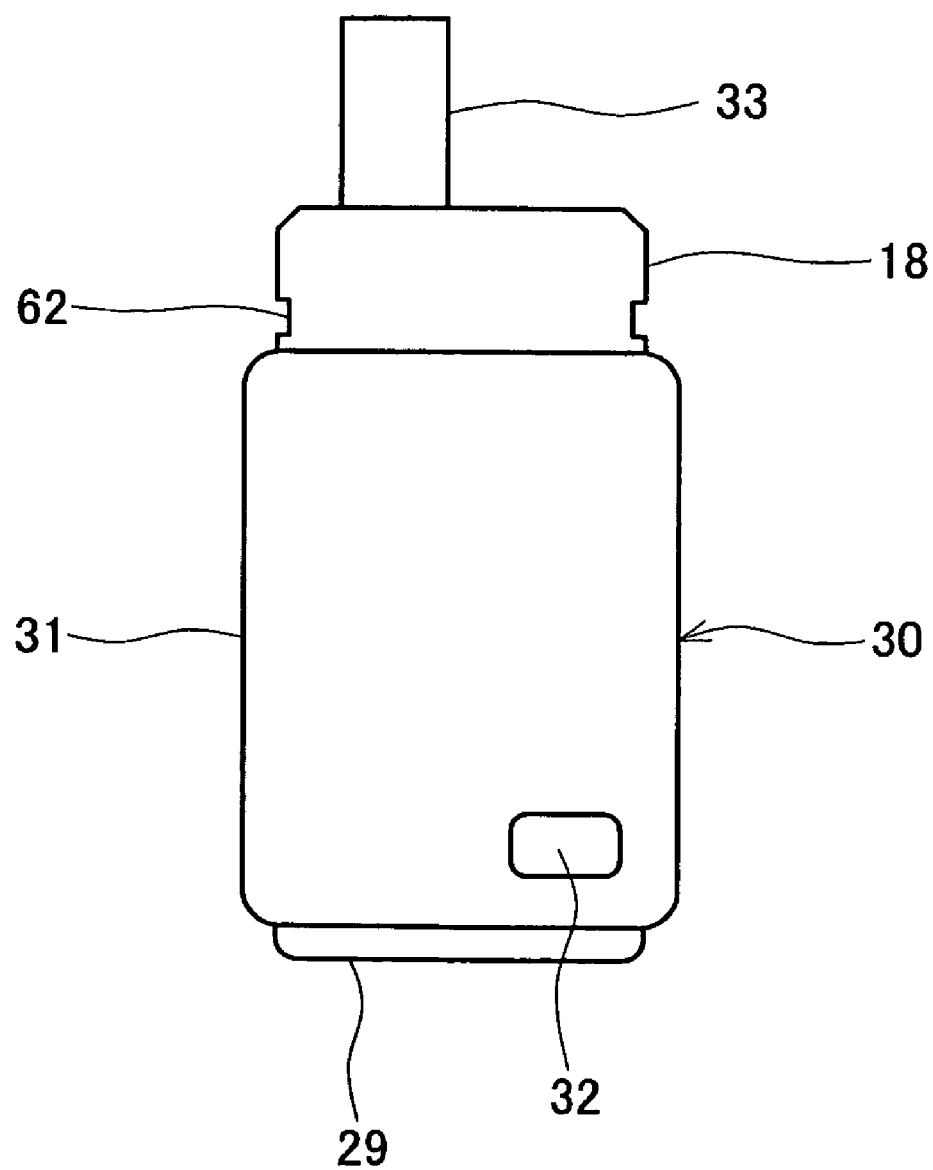
FIG. 23 is a side view of the fuel pump of the third representative embodiment.

As shown in FIG. 23, the upper body 18 of the fuel pump 30 is formed with an indentation 62 that runs around its circumference. The suction port 32 is provided at the bottom side face of the housing 31 of the fuel pump 30.

Figure 24:
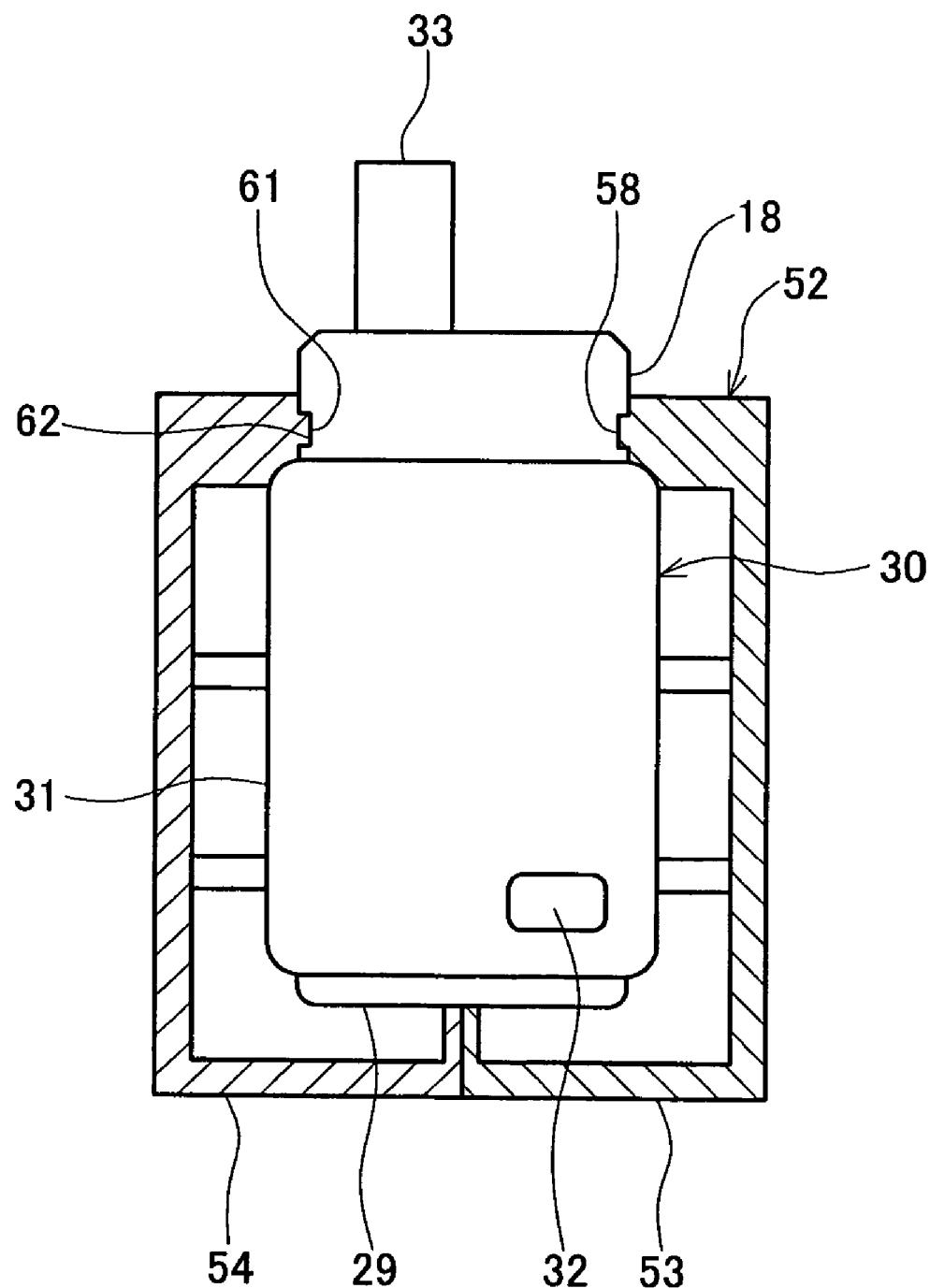
FIG. 24 is a cross-section of the fuel pump unit of the third representative embodiment.

With the fuel pump 30 accommodated inside the fuel filter 52, as shown in FIG. 24, the ridge 58 in the opening 56 of the first frame 53 and the ridge 61 in the opening 60 of the second frame 54 bond with the indentation 62 in the fuel pump 30. This bond between the fuel filter 52 and the upper body 18 of the fuel pump 30 ensures that the fuel filter 52 and the fuel pump 30 are fixed securely. Bonding the ridges 58 and 61 tightly to the indentation 62 ensures a secure seal when the fuel filter 52 is closed.

Figure 25:
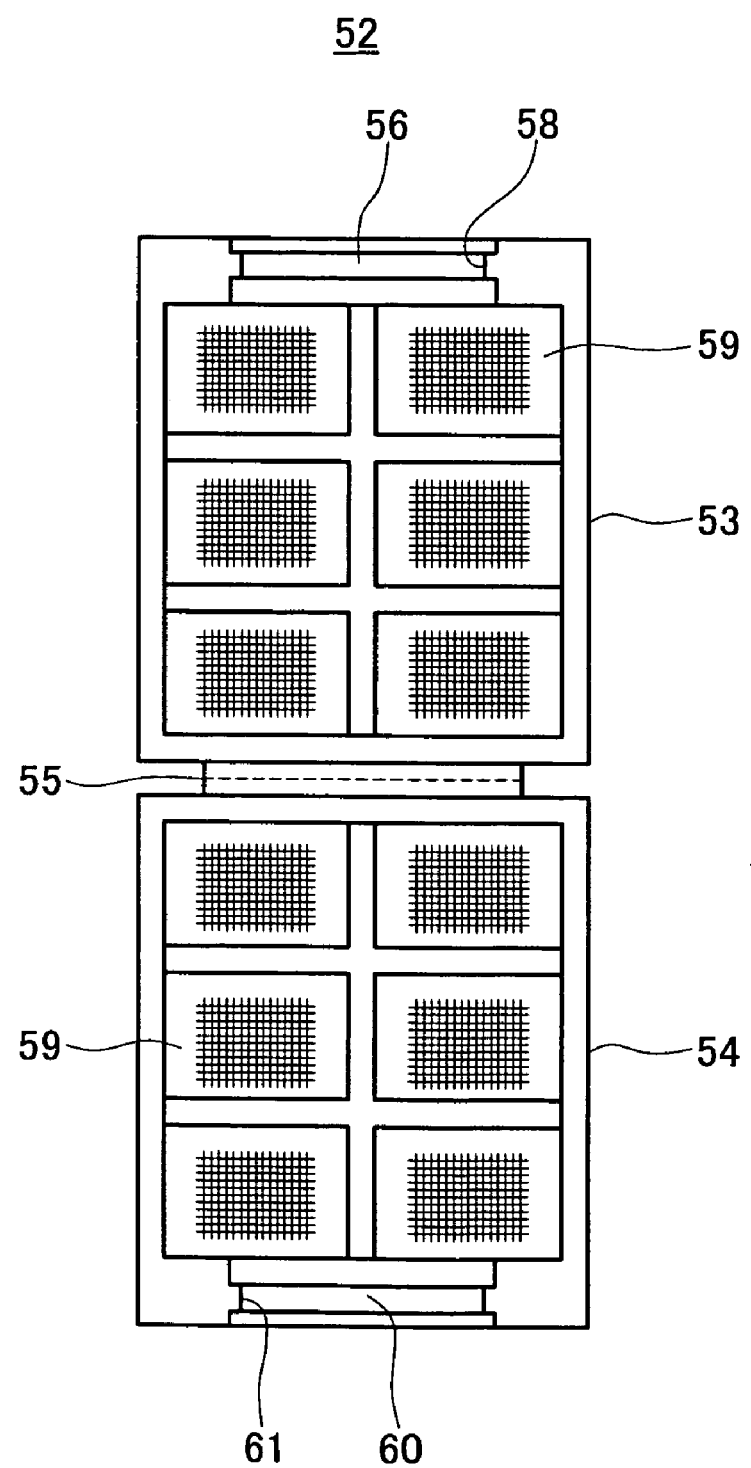
FIG. 25 shows the inside of another example of the fuel filter of the third representative embodiment.

As shown in FIG. 25, the hinge 55 may also be disposed between the bottom of the first frame 53 and the bottom of the second frame 54.

(Fourth Representative Embodiment)

Figure 26:
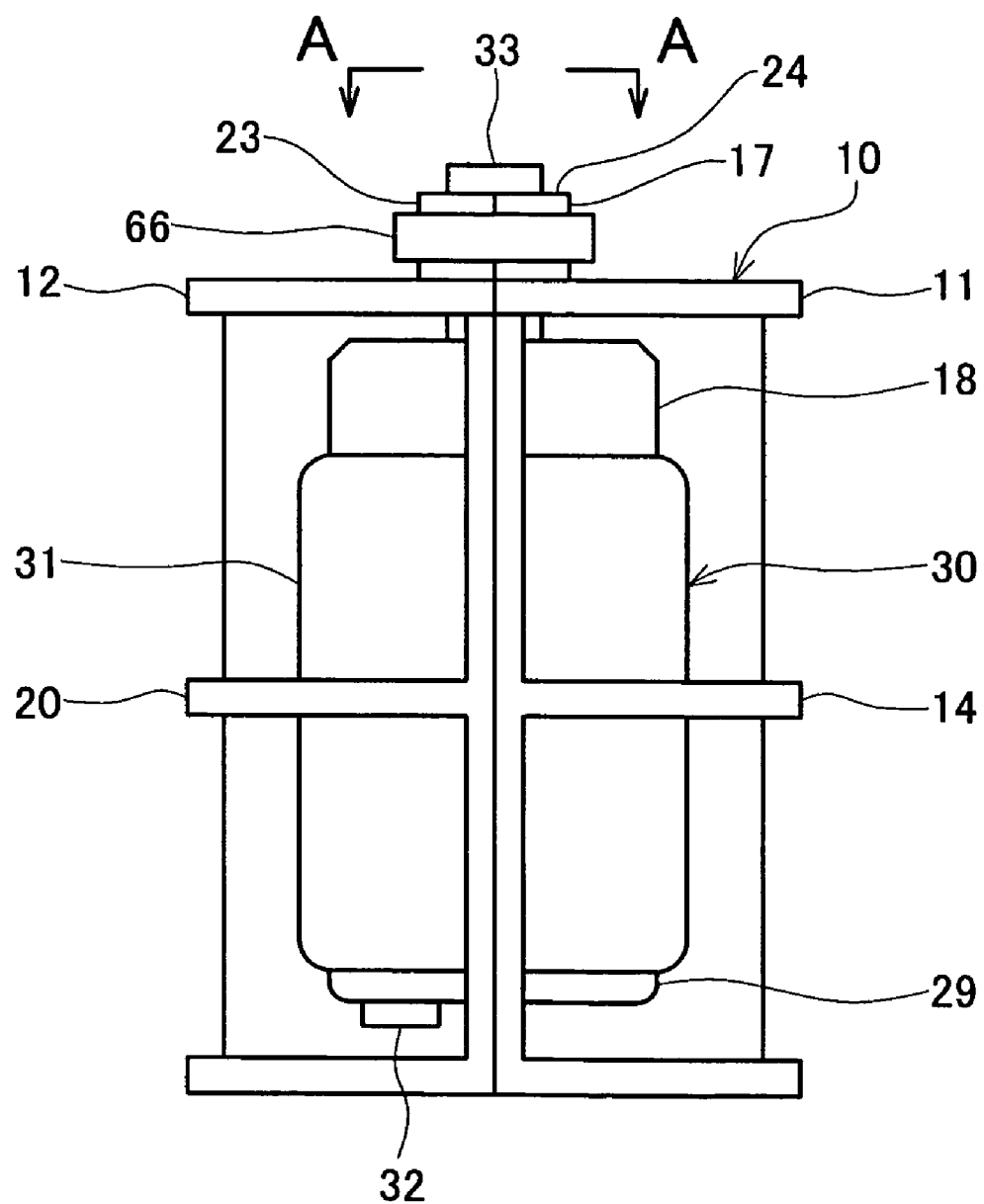
FIG. 26 is a side view of the fuel pump unit of a fourth representative embodiment.
Figure 27:
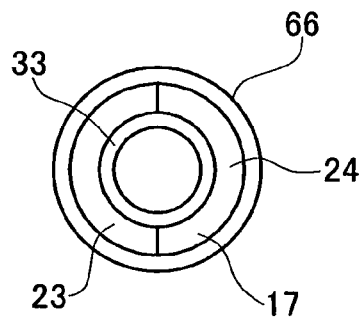
FIG. 27 shows a view along the line A—A within FIG. 26.

As shown in FIGS. 26 and 27, it is also possible to bind the outlet 24 of the fuel filter 10 with a binding ring 66. This helps to prevent the resin frames 14 and 20 from warping and coming apart as a result of swelling or shrinking.

Binding the exit part 24 with the binding ring 66 is particularly effective in a structure in which the hinge 68 is disposed between the bottom of the first frame 44 and the bottom of the second frame 45, as in the fuel filter 43 shown in FIG. 21. In this structure, the top of the fuel filter 43 is bound with the binding ring, and the bottom is connected by the hinge 68, fixing the first frame 14 and the second frame 20 securely in place.

(Fifth Representative Embodiment)

Figure 28:
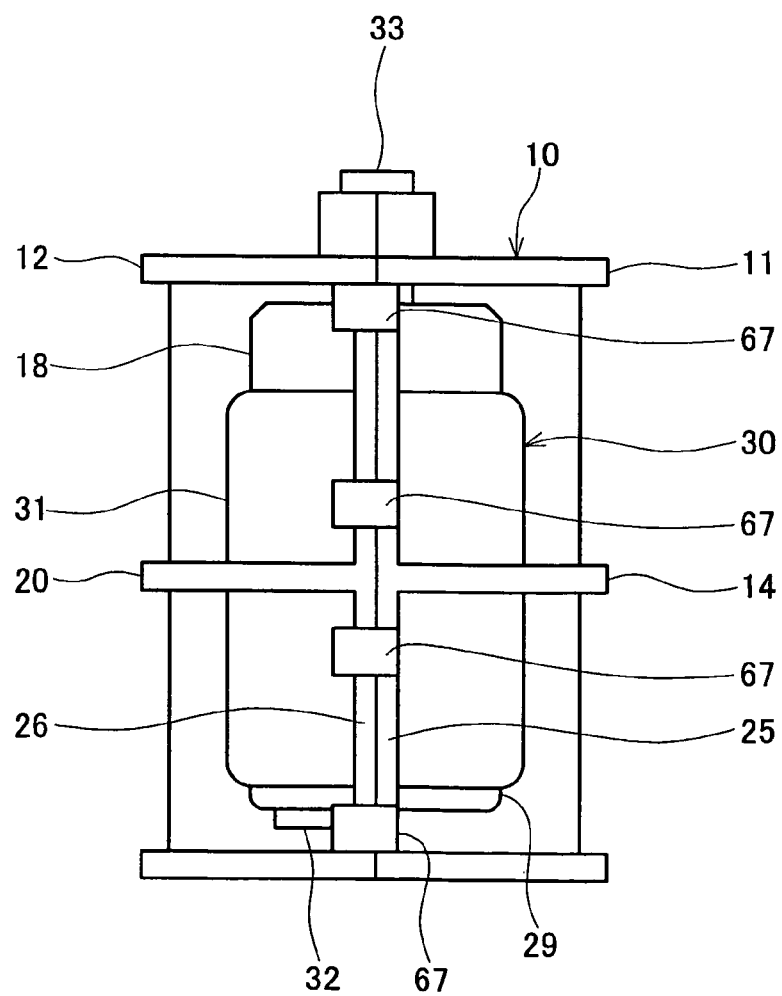
FIG. 28 is a side view of the fuel pump unit of a fifth representative embodiment.
Figure 29:
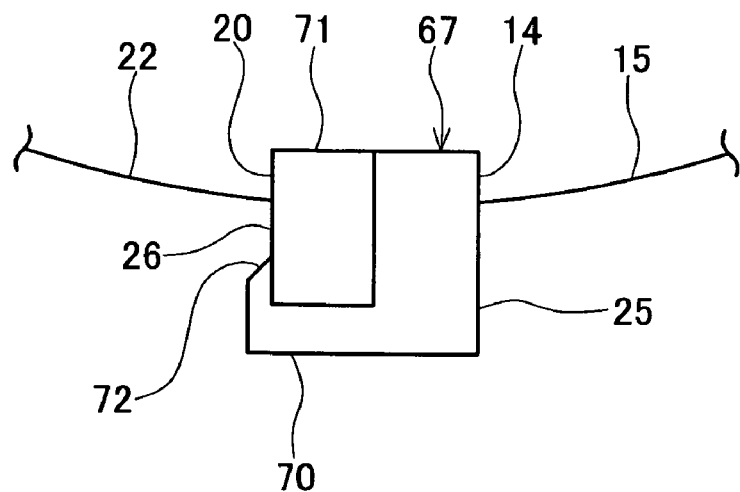
FIG. 29 shows the hook mechanism of the fifth representative embodiment.

As shown in FIG. 28, a hook mechanism is provided on the fuel filter 10. Eight hook mechanisms 67 are provided in total (FIG. 28 shows the four hook mechanisms 67 provided on one side of the fuel filter 10). As shown in FIG. 29, the hook mechanism 67 comprises a hook 70 formed on the side edge 25 and a hook receiving portion 71 formed on the side edge 26. The hook 70 latches immovably onto the hook receiving portion 71, and the first filter 11 and the second filter 12 are fixed securely in place. During the latching process, the hook 70 fits over the hook receiving portion 71 and deforms to fit therewith. The hook 70 is shaped with a slanted edge 72, so that the hook 70 can easily fit over the hook receiving portion 71. This structure makes it possible to prevent the frames 14 and 20 from separating as a result of any warping due to swelling or shrinking, and to prevent any damage to the seal between the frames 14 and 20.

Figure 30:
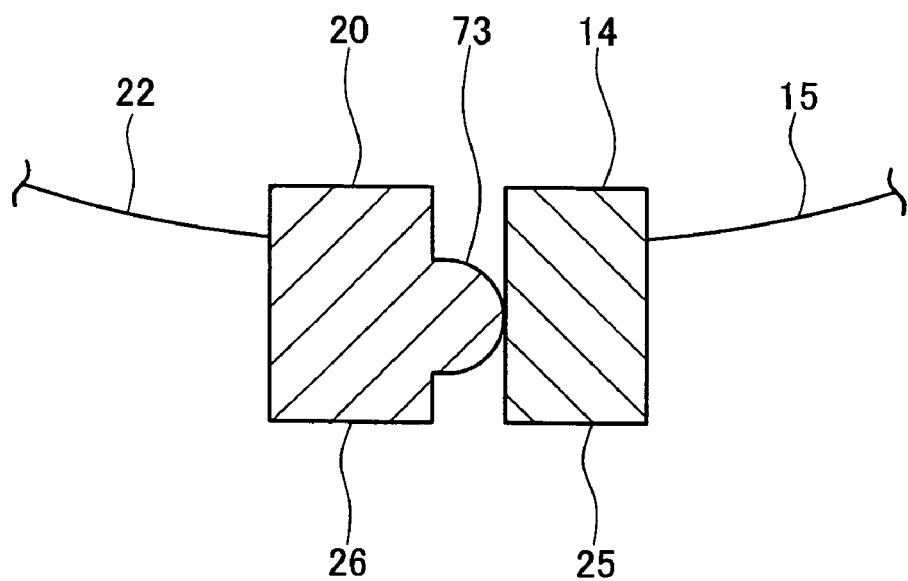
FIG. 30 is a cross-section showing an example of the fuel filter seal of the fifth representative embodiment.

As shown in FIG. 30, it is also possible to form a ridge 73 that extends in a longitudinal direction along the side edge 26 of the second frame 20. The cross-sectional shape of the ridge 73 is semi-circular. The ridge 73 and the side edge 25 of the first frame 14 make linear contact. The contact pressure between the ridge 73 and the side edge 25 increases when the ridge 73 and the side edge 25 make linear contact, securing a strong seal between the frames 14 and 20. The cross-sectional shape of the ridge part 73 need not be a semi-circle. For example, it would also be possible to give the ridge 73 a triangular cross-sectional shape, and to have the tip of this triangle make linear contact with the side edge 25 of the first frame 14.

Figure 31:
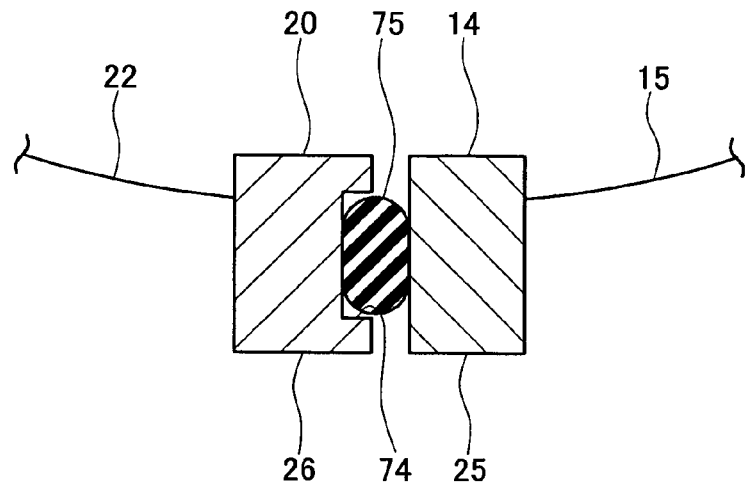
FIG. 31 is a cross-section showing another example of the fuel filter seal of the fifth representative embodiment.

As shown in FIG. 31, it is also possible to form a groove 74 that extends in a longitudinal direction along the side edge 26 of the second frame 20, and to dispose a seal 75 into this groove. The seal 75 is molded from a substance having elasticity (e.g., rubber). When the first filter 11 and the second filter 12 are joined together, the seal 75 is pressed by the side edge 25 of the first frame 14 and deforms to fuse therewith. This ensures that the seal 75 and the side edge 25 adhere closely together, and makes it possible to improve the seal between the first frame 14 and the second frame 20. Providing the groove 74 makes it easy to fix the position of the seal 75 as required.

(Sixth Representative Embodiment)

Figure 32:
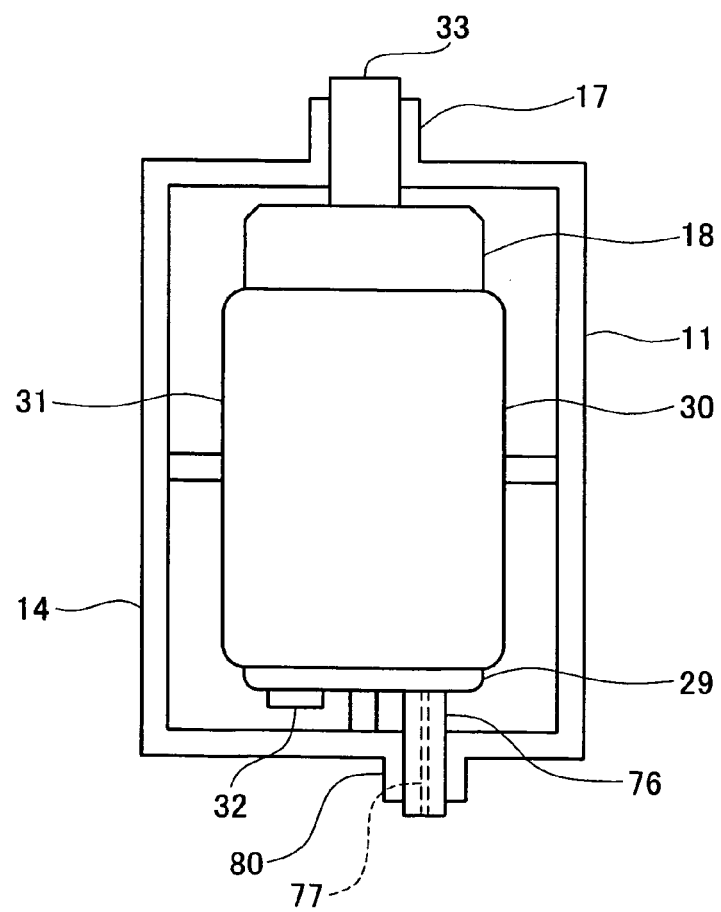
FIG. 32 is a side view of the fuel pump unit of a sixth representative embodiment (with the second filter removed).

As shown in FIG. 32, a vapor discharge pipe 76 is provided on the lower body 29 of the fuel pump 30, protruding downward. The vapor discharge pipe 76 has a circular cross-sectional shape, and a vapor discharge passage 77 is formed inside. The vapor discharge passage 77 has an inlet at the bottom of the vapor discharge pipe 76. A support 80 is provided in the first frame 14 of the first filter 11. The inner circumference of the support 80 has a semi-circular cross-sectional shape. A similar support having a shape matching that of the support 80 is provided on the second frame 20 of the second filter 12, though this is not shown in FIG. 32. When the first filter 11 and the second filter 12 are joined together, the vapor exhaust pipe 76 of the fuel pump 30 is held between the support 80 of the first frame 14 and the support of the second frame 20. The discharge port 33 of the fuel pump 30 is held between the half-cylinder 17 of the first frame 14 and the half-cylinder 23 of the second frame 20. Consequently, the first filter 11 and the second filter 12 support the top and bottom of the fuel pump 30, so that the fuel pump 30 is attached to the fuel filter 10 in a steady position. Any vapor produced at the impeller 39 when the fuel is at high temperatures passes through the vapor discharge passage 77 and is discharged to the outside of the fuel filter 10.

(Seventh Representative Embodiment)

Figure 33:
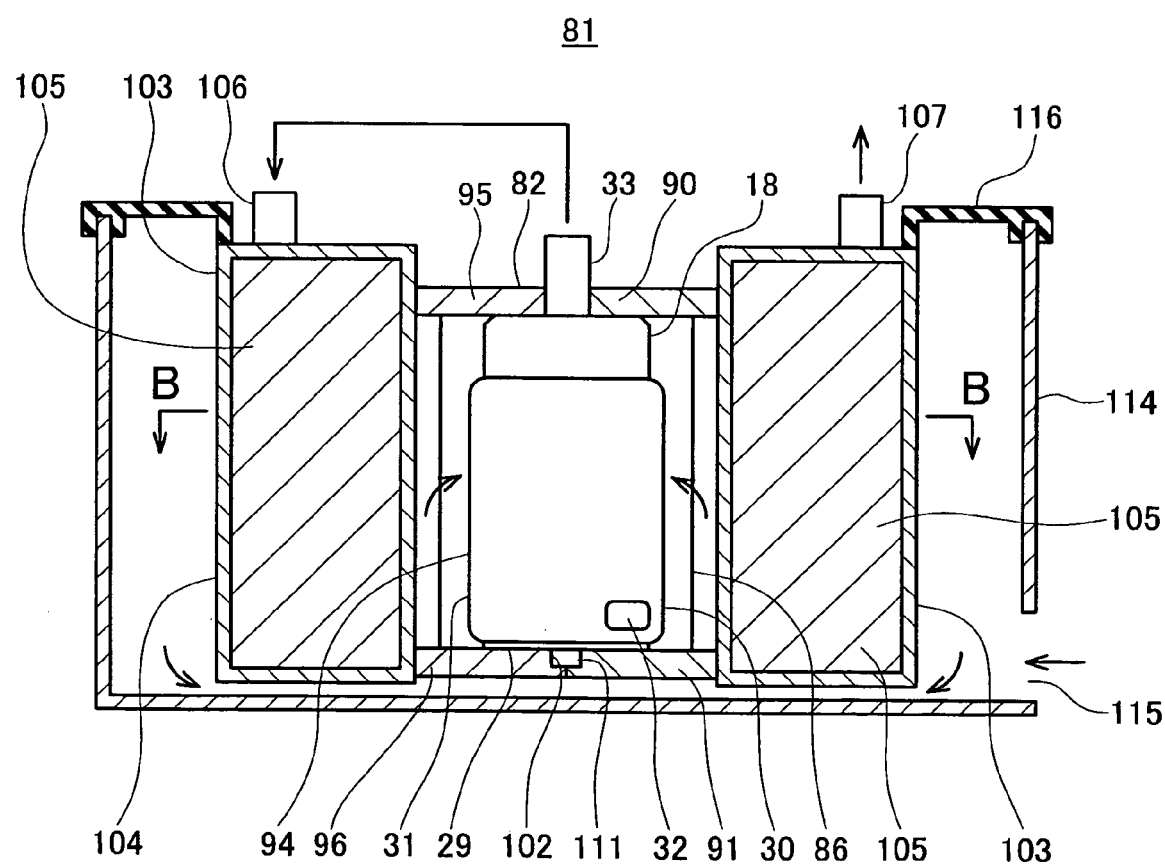
FIG. 33 is a cross-section of the fuel supply apparatus of a seventh representative Embodiment.

As shown in FIG. 33, the fuel supply apparatus 81 comprises a fuel filter 82, a high-pressure filter 103, a reserve cup 114, and a filter support 116.

Figure 34:
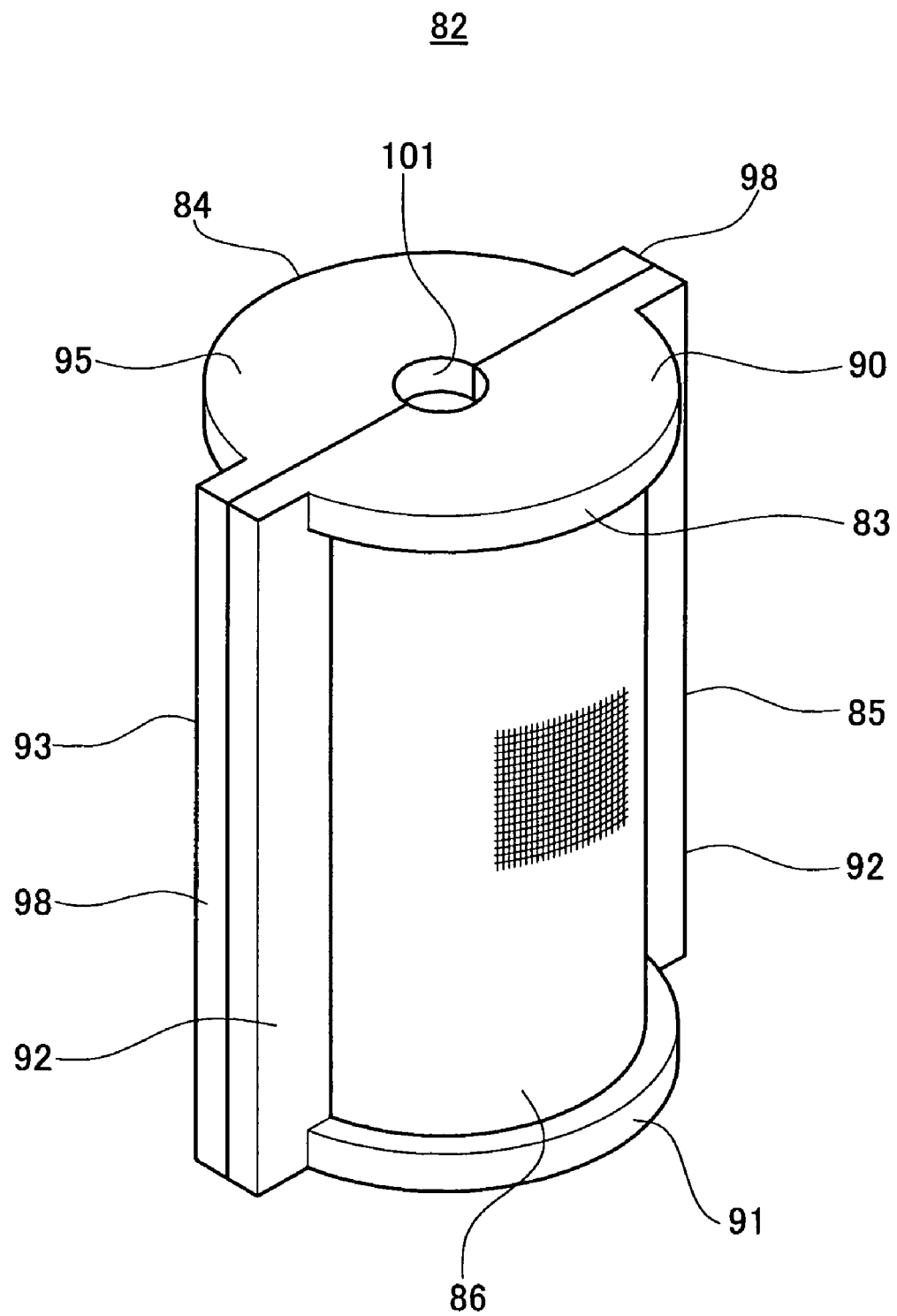
FIG. 34 is a perspective view of an example of the fuel filter of the seventh representative embodiment.

As shown in FIG. 34, the fuel filter 82 comprises a first filter 83 and a second filter 84. The first filter 83 comprises a first frame 85 and a filter 86. The first frame 85 is made up of a substantially semi-circular top 90, a bottom 91 of the same substantially semi-circular shape, and a side 92 that joins the top 90 and the bottom 91. The filter 86 is semi-cylindrical in shape, and is fitted into the first frame 85, sealing the opening thereof.

Figure 35:
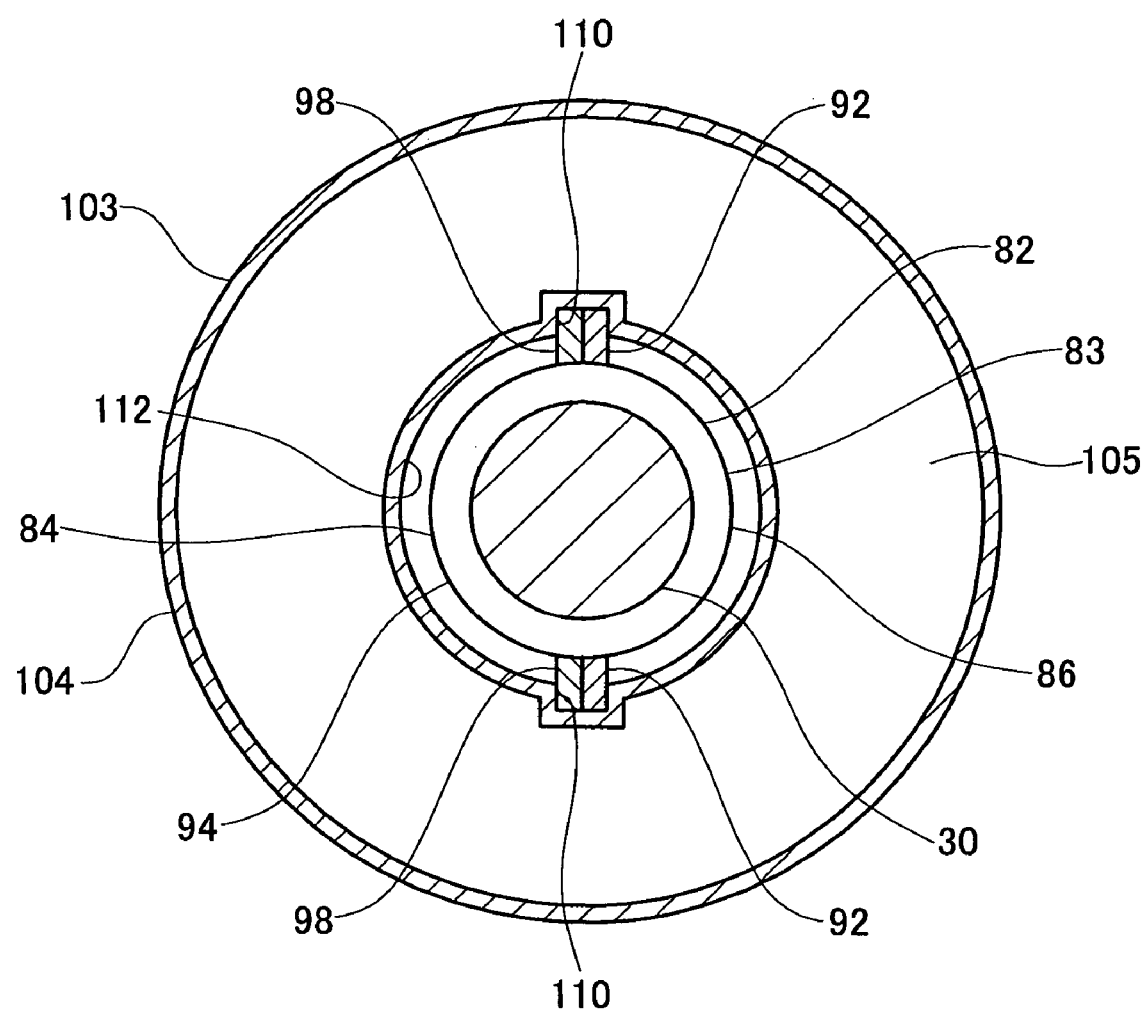
FIG. 35 is a cross-section taken along the line B—B within FIG. 33.

The second filter 84 has a second frame 93, and a filter 94 (shown in FIG. 35). The second frame 93 has a shape matching that of the first frame 85 described above, and comprises a top 95, a bottom 96 (shown in FIG. 33), and two sides 98.

When the first filter 83 and the second filter 84 are joined together, the side 92 of the first frame 85 and the side 98 of the second frame 93 overlap, and the top 90 of the first frame 85 and the top 95 of the second frame 93 form an outlet 101 having a circular cross-sectional opening. Further, when the first filter 83 and the second filter 84 are joined together, an indentation 102 with a circular cross-sectional shape is formed by the bottom 91 of the first frame 85 and the bottom 96 of the second frame 93 (shown in FIG. 33).

As shown in FIG. 33, the fuel pump 30 is accommodated inside the fuel filter 82, with the first filter 83 and the second filter 84 joined together. A ridge 111 is provided protruding downward from the bottom center of the lower body 29 of the fuel pump 30. With the fuel pump 30 accommodated inside the fuel filter 82, the ridge 111 of the fuel pump 30 is inserted into the indentation 102 of the fuel filter 83, and the discharge port 33 is enclosed by the outlet 101 of the fuel filter 82. Various structures may be employed in order to fix the first filter 83 and the second filter 84 together, such as those described for Embodiments 1 through 6 above.

As shown in FIG. 33 and FIG. 35, the high-pressure filter 103 comprises an outer shell 104 and a filter 105 accommodated within the outer shell 104 (in FIG. 35, the filter 105 is shown without crisscross shading in order to make the diagram clearer). An inlet port 106 and an outlet port 107 are provided at the top of the high-pressure filter 103. As shown in FIG. 35, the high-pressure filter 103 has a donut-like planar shape. Two vertically extending indentations 110 are formed opposite one another on the inner circumference wall 112 of the outer shell 104 of the high-pressure filter 103. The fuel filter 82 accommodates the fuel pump 30, and is attached to the high-pressure filter 103. When attaching the fuel filter 82 to the high-pressure filter 103, the first filter 83 and the second filter 84 are joined together, with the sides 92 and 98 overlapping, and these overlapping sides 92 and 98 are inserted into the indentations 110 of the high-pressure filter 103. The vertical position of the fuel filter 82 is fixed by the abutting of the sides 92 and 98 against the bottom of the indentations 110. It is preferable that the overlapping sides 92 and 98 should be forcibly inserted into the indentations 110. This ensures that the fuel filter 82 is securely attached to the high-pressure filter 103.

As shown in FIG. 33, the top of the reserve cup 114 is left open, while a fuel inlet 115 is provided at the bottom side face thereof. Fuel from the fuel tank is sent into the reserve cup 114 from the fuel inlet 115.

The filter support 116 has a substantially hollow disk shape. The outer circumference of the filter support 116 is welded to the reserve cup 114, with the top of the reserve cup 114 inserted therein. The inner circumference of the filter support 116 is welded to the outer circumference of the top of the high-pressure filter 103. With the filter support 116 supporting the high-pressure filter 103, a gap is formed between the bottom of the high-pressure filter 103 and the bottom face of the reserve cup 114.

Because fuel is sent in from the fuel inlet 115, the level of the fuel within the reserve cup 114 is maintained at a sufficient height to immerse the fuel filter 82, even if the fluid level in the fuel tank drops. Fuel sent into the reserve cup 114 passes through the gap between the bottom of the high-pressure filter 103 and the bottom face of the reserve cup 114, and then passes through the filters 86 and 94 of the fuel filter 82. Impurities in the fuel are removed as the fuel passes through the filters 86 and 94. The fuel pump 30 sucks up the fuel that has passed through the filters 86 and 94 through the suction port 32 and pressurizes it. The pressurized fuel is then discharged through the discharge port 33 of the fuel pump 30. The fuel discharged from the discharge port 33 is sent on to the inlet port 106 of the high-pressure filter 103. The fuel sent on to the inlet port 106 is further filtered of impurities by means of the filter 105 accommodated inside the high-pressure filter 103, and then sent out through the outlet port 107.

In this fuel supply apparatus 81, the fuel pump 30 is accommodated within the fuel filter 82, and this fuel filter 82 is attached to the high-pressure filter 103. The high-pressure filter 103 is fitted to the reserve cup 114. Consequently, any vibrations produced by the functioning of the fuel pump 30 are transmitted along the following route: the fuel pump 30→the fuel filter 103→the high-pressure filter 103→the reserve cup 114. Consequently, the transmission of vibrations from the fuel pump 30 to the reserve cup 114 follows a longer route within the fuel supply apparatus 81 of the present embodiment compared to the conventional technology. Because of this, there is greater attenuation of vibrations, and the operating noise of the fuel pump 30 is reduced. Furthermore, because the frames 85 and 93 of the fuel filter 103 have large openings, there is relatively low rigidity, and this too contributes to attenuation of vibrations.

Figure 36:
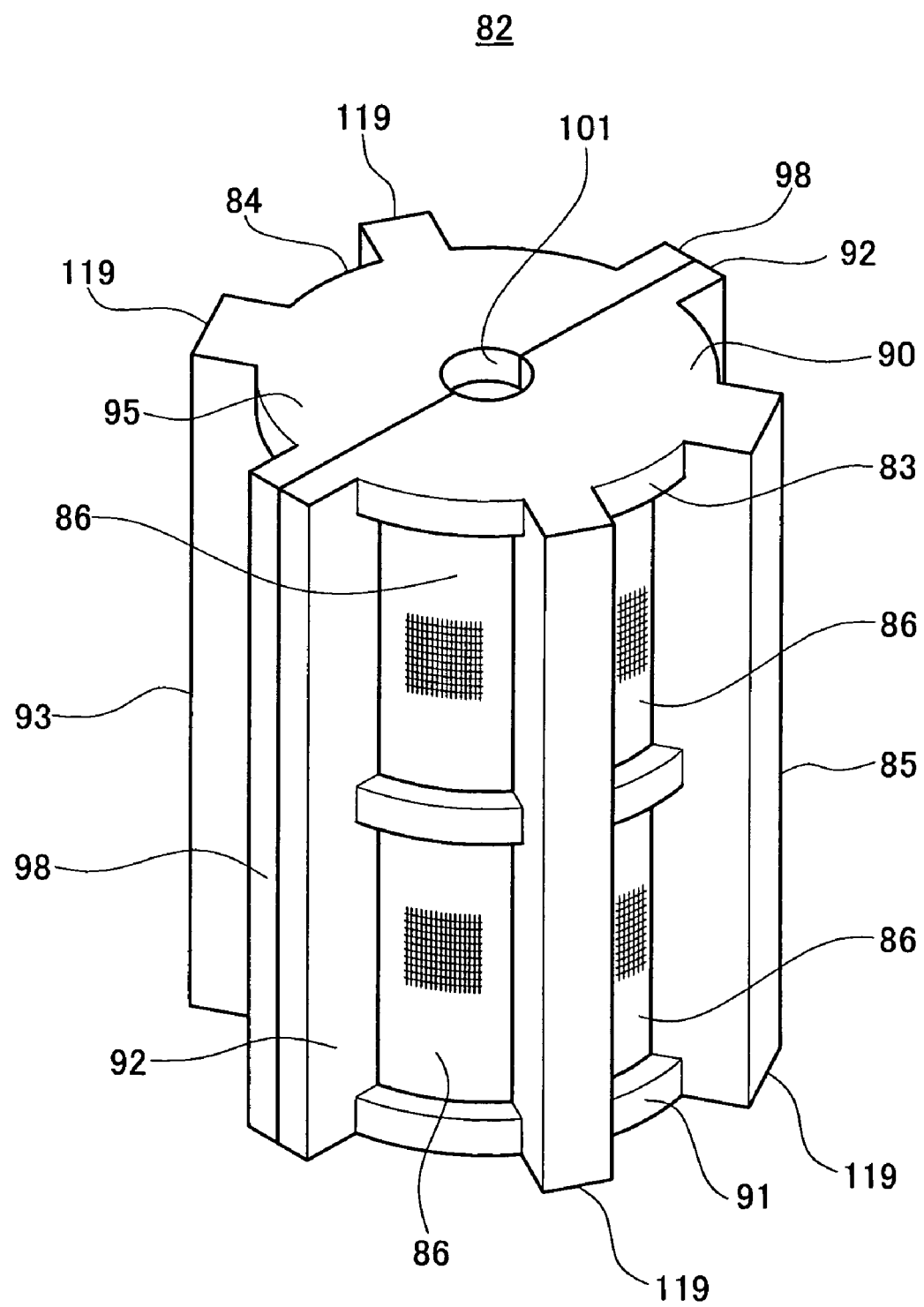
FIG. 36 is a perspective view of another example of the fuel filter of the seventh representative embodiment.
Figure 37:
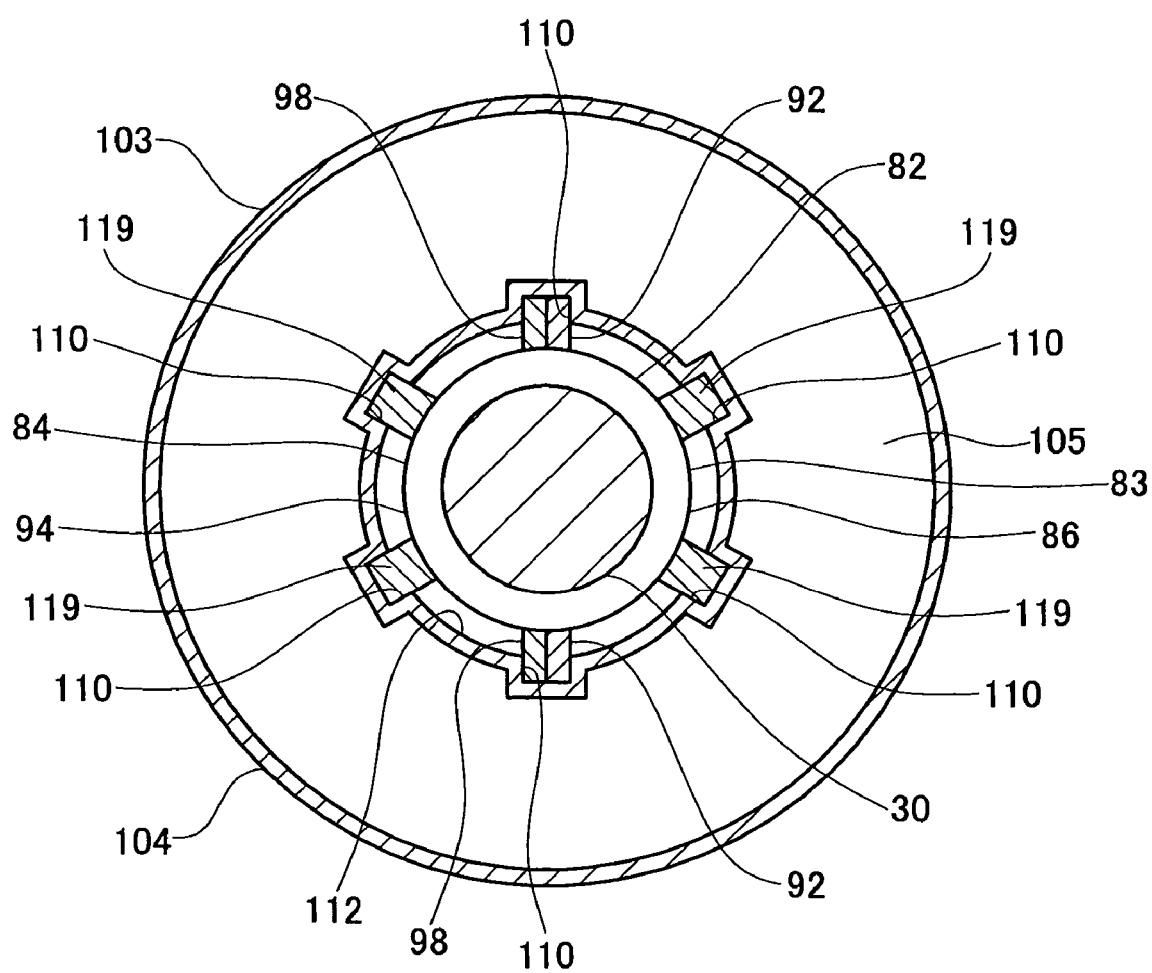
FIG. 37 is a cross-section of the fuel pump, the fuel filter, and the high-pressure filter, taken perpendicular to the axial direction of the seventh representative embodiment.

As shown in FIG. 36, side parts 119 can be further provided on the first frame 85 of the first filter 83 and the second frame 93 of the second filter 84. In this case, as shown in FIG. 37, indentations 110 are further provided on the inner circumference wall 112 of the high-pressure filter 103, and the side parts 119 are inserted into these indentations 110. This structure ensures that the fuel filter 82 is attached still more securely to the high-pressure filter 103, as well as preventing any warping of the frames 85 and 93 or the filters 86 and 94.

Finally, although the preferred representative embodiment has been described in detail, the present embodiment is for illustrative purpose only and not restrictive. It is to be understood that various changes and modifications may be made without departing from the spirit or scope of the appended claims. In addition, the additional features and aspects disclosed herein also may be utilized singularly or in combination with the above aspects and features.

The invention claimed is:

1. A fuel pump unit comprising:
   a fuel pump having a suction port, a discharge port, and a vapor discharge pipe that protrudes downward from one end of the fuel pump, the fuel pump drawing in fuel through the suction port, increasing the pressure of the drawn fuel, and discharging the pressurized fuel from the discharge port; and
   a fuel filter for removing impurities from the fuel drawn into the fuel pump, the fuel filter comprising a frame formed with an opening and a filter that seals the opening of the frame, wherein an internal space is formed by the frame and the filter, wherein the fuel pump is substantially accommodated within the internal space of the fuel filter, the suction port of the fuel pump is positioned in the internal space of the fuel filter, and the discharge port of the fuel pump protrudes outside the internal space of the fuel filter, and wherein the frame comprises a first frame and a second frame, each of the first and second frames comprising a support, the vapor discharge pipe being held between the support of the first frame and the support of the second frame, and a tip portion of the vapor discharge pipe being positioned outside the fuel filter.

2. A fuel pump unit as in claim 1, wherein the discharge port of the fuel pump protrudes from an opposite end of the fuel pump, and the fuel filter is fitted to the discharge port.

3. A fuel pump unit as in claim 1, wherein the discharge port of the fuel pump is provided at an opposite of the fuel pump, and the fuel filter is fitted to one end on the discharge port side of the fuel pump.

4. A fuel pump unit as in claim 1, wherein the frame is divisible into at least two pieces.

5. A fuel pump unit as in claim 1, wherein the frame further comprises a a hinge that allows the second frame to open and close relative to the first frame.

6. A fuel pump unit as in claim 5, wherein the first frame, the second frame, and the hinge are molded together as a single body.

7. A fuel supply apparatus comprising:
a fuel pump having a suction port and a discharge port, the fuel pump drawing in fuel through the suction port, increasing the pressure of the drawn fuel, and discharging the pressurized fuel from the discharge port;
a fuel filter for removing impurities from the fuel drawn in by the fuel pump, the fuel filter comprising a frame formed with an opening and a filter that seals the opening, wherein an internal space is formed by the frame and the filter; and
a high-pressure filter for further filtering the fuel discharged from the fuel pump;

wherein the fuel pump is substantially accommodated within the internal space of the fuel filter, the suction port of the fuel pump is positioned in the internal space of the fuel filter, the discharge port of the fuel pump protrudes outside the internal space of the fuel filter, the fuel filter is disposed inside of the high-pressure filter and fitted to the high-pressure filter, and the high-pressure filter is fitted to the fuel tank.

8. A fuel supply apparatus as in claim 7, wherein the fuel pump draws and discharges fuel from within a reserve cup provided inside the fuel tank, and the high-pressure filter is fitted to the fuel tank via the reserve cup.

9. A fuel pump unit comprising:
a fuel pump having a suction port and a discharge port, the fuel pump drawing in fuel through the suction port, increasing the pressure of the drawn fuel, and discharging the pressurized fuel from the discharge port; and
a fuel filter for removing impurities from the fuel drawn into the fuel pump, the fuel filter comprising a frame formed with an opening and a filter that seals the opening of the frame, wherein an internal space is formed by the frame and the filter, wherein the fuel pump is substantially accommodated within the internal space of the fuel filter, the suction port of the fuel pump is positioned in the internal space of the fuel filter, and the discharge port of the fuel pump protrudes outside the internal space of the fuel filter, and wherein the frame comprises a first frame, a second frame, and a hinge that allows the second frame to open and close relative to the first frame.

10. A fuel pump unit as in claim 9, wherein the first frame, the second frame, and the hinge are molded together as a single body.

* * * * *